US012789151B2

(12) United States Patent
Federighi et al.

(10) Patent No.: US 12,789,151 B2
(45) Date of Patent: Nov. 10, 2026

(54) BAFFLE ELEMENTS AND STATIC MIXERS INCLUDING BAFFLES ELEMENTS

(71) Applicant: Koflo Corporation, Cary, IL (US)

(72) Inventors: Nicholas James Federighi, Barrington, IL (US); Christopher James Federighi, Barrington, IL (US)

(73) Assignee: Koflo Corporation, Cary, IL (US)

(*) Notice: Subject to any disclaimer, the term of this patent is extended or adjusted under 35 U.S.C. 154(b) by 936 days.

(21) Appl. No.: 18/070,097

(22) Filed: Nov. 28, 2022

(65) Prior Publication Data

US 2024/0173681 A1 May 30, 2024

(51) Int. Cl.
*B01F 25/431* (2022.01)
*B01F 25/314* (2022.01)

(52) U.S. Cl.
CPC ...... *B01F 25/4316* (2022.01); *B01F 25/3141* (2022.01); *B01F 25/431974* (2022.01)

(58) Field of Classification Search
CPC .............. B01F 25/3141; B01F 25/4316; B01F 25/43161; B01F 25/43162; B01F 25/43163
See application file for complete search history.

(56) References Cited

U.S. PATENT DOCUMENTS

| | | | | |
|---|---|---|---|---|
| 5,839,828 A | 11/1998 | Glanville | | |
| 9,248,418 B1 | 2/2016 | Smith et al. | | |
| 2004/0223408 A1* | 11/2004 | Mathys | B01F 25/4322 | 366/337 |
| 2011/0174407 A1* | 7/2011 | Lundberg | B01F 25/4315 | 138/37 |

(Continued)

FOREIGN PATENT DOCUMENTS

| | | | | |
|---|---|---|---|---|
| CN | 212327973 U * | 1/2021 | | |
| CN | 113083056 A * | 7/2021 | | B01F 25/42 |
| CN | 213895221 U * | 8/2021 | | |
| CN | 215463966 U * | 1/2022 | | |
| WO | WO-2013168745 A1 * | 11/2013 | | B01F 25/00 |

(Continued)

OTHER PUBLICATIONS

Ayiehfor, C.M. and Dieunedort, N. (2024) The Effects of Fluid Structure Interaction (FSI) on a Baffle Hole in Mobile Storage Tank. Open Journal of Fluid Dynamics, 14, 205-223. https://doi.org/10.4236/ojfd.2024144010 (Year: 2024).*

Static Mixers PAC (WAFER), UET Mixers, Mechanic Falls, ME, 2022, 3 pages.

(Continued)

*Primary Examiner* — Claire X Wang
*Assistant Examiner* — Patrick M Mccarty
(74) *Attorney, Agent, or Firm* — Banner & Witcoff, Ltd.

(57) ABSTRACT

Static mixers include: (i) a base member having a perimeter wall that defines an open interior space; and (ii) at least one baffle section located within the open interior space. The baffle section(s) may include a surface that extends between an outer perimeter side or outer perimeter region and an inner edge or inner region. The outer perimeter side or outer perimeter region defines at least one outer perimeter fluid passageway or perimeter open space that allows fluid flow through the static mixer. In some examples, the inner region of the baffle section may be angled forward from the outer perimeter region in the direction of fluid flow through the mixer. Additionally, in some examples, the static mixer may include two baffle sections, e.g., baffle sections that are spaced apart and/or mirror images of one another.

16 Claims, 9 Drawing Sheets

(56) References Cited

U.S. PATENT DOCUMENTS

| | | | | |
|---|---|---|---|---|
| 2018/0244539 | A1* | 8/2018 | Asdahl | B01F 25/42 |
| 2018/0250700 | A1* | 9/2018 | Hirai | B05C 5/0225 |
| 2019/0338888 | A1* | 11/2019 | Selirio | B01F 25/431974 |

OTHER PUBLICATIONS

Storm Mixer, 2012-2018, 5 pages, https://stormmix.com/index.php/short-lay-length-wafer-style-static-mixers.

* cited by examiner

BAFFLE ELEMENTS AND STATIC MIXERS INCLUDING BAFFLES ELEMENTS

FIELD OF THE INVENTION

Aspects of the present technology relate to baffle elements and static mixers including such baffle elements, such as wafer-style static mixers and/or static mixers incorporated into an interior of a fluid line (e.g., as one or more mounted baffle elements within a fluid line interior). Such baffle elements and static mixers may be used as in-line mixers to mix components injected into and/or flowing within a pipeline.

BACKGROUND

Conventional wafer-style static mixers rely primarily on back-mixing and flow recirculation. Such reliance can result in highly transient flow characteristics, a wide residence time distribution, and/or elevated chemical concentrations on the discharge side of the mixing plates.

SUMMARY

As noted above, aspects of the present technology relate to baffle elements and static mixers including such baffle elements, such as wafer-style static mixers and/or static mixers incorporated into an interior of a fluid line (e.g., as one or more mounted baffle elements within a fluid line interior). Such baffle elements and static mixers may be used as in-line mixers to mix components injected into and/or flowing within a pipeline.

BRIEF DESCRIPTION OF THE DRAWINGS

The following Detailed Description will be better understood when considered in conjunction with the accompanying drawings in which like reference numerals refer to the same or similar elements in all of the various views in which that reference number appears.

DETAILED DESCRIPTION

Figure 1A:
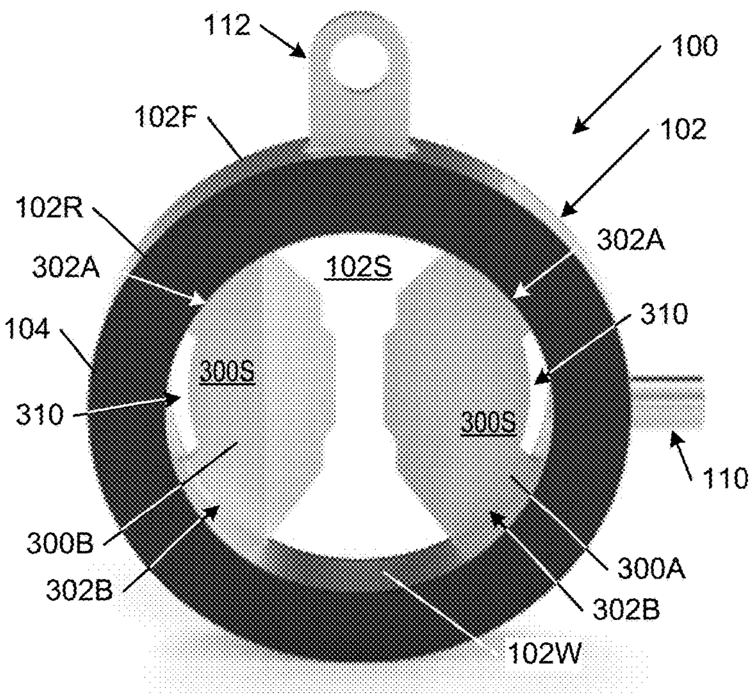
FIGS. 1A, 1B, and 1C provide various views of a wafer-style static mixer in accordance with some aspects of this technology.

In the following description of various examples of baffle elements and static mixers according to the present technology, reference is made to the accompanying drawings, which form a part hereof, and in which are shown by way of illustration various example structures, methods, and environments in which aspects of this technology may be practiced. It is to be understood that other structures, methods, and environments may be utilized and that structural and functional modifications may be made to the specifically described structures, functions, and methods without departing from the scope of the present disclosure.

This application and/or claims use the adjectives, e.g., "first," "second," "third," and the like, to identify certain components and/or features relating to this technology. These adjectives are used merely for convenience, e.g., to assist in maintaining a distinction between components and/or features of a specific structure. Use of these adjectives should not be construed as requiring a specific order or arrangement of the components and/or features being discussed. Also, use of these specific adjectives in the specification for a specific structure does not require that the same adjective be used in the claims to refer to the same part (e.g., a component or feature referred to as the "third" in the specification may correspond to any numerical adjective used for that component or feature in the claims).

The term "proximate to" as used herein in the context of defining the location of a fluid passageway (e.g., a slot, open perimeter space, etc.) with respect to an outer perimeter edge of a baffle section and/or with respect to a perimeter wall of a housing means that at least 50% of the outermost edge of the fluid passageway will be located within $0.1\times D$ from the outer perimeter edge of a baffle section and/or within $0.1\times D$ from the perimeter wall of the housing, wherein D is a base dimension (e.g., diameter) of the interior perimeter wall. In some examples, at least 50% of the outermost edge of the fluid passageway may be located within $0.05\times D$, within $0.025\times D$, or even within $0.01\times D$ from the outer perimeter edge of the baffle section and/or from the perimeter wall of the housing.

I. General Description of Aspects of this Technology

In at least some examples of this technology, a static mixer will include symmetric baffle elements (also called "mixing plates") that, in at least some examples, may improve additive dispersion and/or reduce pressure loss while maintaining a tight residence time distribution (RTD) for the additive flow. In accordance with at least some aspects of this technology, one or more of the baffle elements may include an opening or fluid passageway at or proximate to its outer perimeter edge (e.g., proximate to and/or opening at a sidewall of the static mixer's base element). While not wishing to be bound by any specific theory of operation, the perimeter opening(s) or fluid passageway(s) may function as a recirculation disruption orifice at the base of the mixing plate(s), e.g., to help assure that the recirculation process starts downstream of the mixer while preventing full recirculation zones from forming. These perimeter opening(s) or fluid passageway(s) may help reduce the uneven effects of back-mixing and recirculation near the static mixer "wafer" ring while encouraging turbulent dispersion downstream. Further, in accordance with at least some examples of this technology, the static mixer may be fully drainable when installed in any orientation.

Static mixers (e.g., wafer-style static mixers, static mixers mounted within a fluid pipeline, etc.) in accordance with some aspects of this technology may include: (i) a housing having a perimeter wall that defines an open interior space (e.g., wherein the open interior space extends completely through the housing); and (ii) a first baffle section located within the open interior space, the first baffle section including a first surface oriented to receive fluid flow that extends between a first outer perimeter side and a first inner edge. This first outer perimeter side may include: (i) a first closed perimeter portion, (ii) a second closed perimeter portion, and (iii) a first perimeter open space defining a first fluid flow passage between the first closed perimeter portion and the second closed perimeter portion. In some examples, the perimeter wall of the housing may form one surface of the first fluid flow passage, e.g., such that fluid flowing through the first fluid flow passage may directly contact the perimeter wall of the housing throughout the first fluid flow passage. Thus, the first fluid flow passage may constitute an opening (e.g., an open slot) provided between the outer edge of the first outer perimeter side of the first baffle section and the perimeter wall of the housing. Alternatively, the first perimeter open space may constitute an opening (e.g., a slot) defined through the first baffle section and located proximate to the outer edge of the first outer perimeter side of the first baffle section and/or proximate to the perimeter wall of the housing.

Static mixers of the types described above further may include a second baffle section within the open interior space and located opposite the first baffle section. The first and second baffle sections may be portions of a single baffle component part or they may be formed as separate parts. In some examples of this technology, the second baffle section may include a second surface oriented to receive fluid flow. The second surface may extend between a second outer perimeter side and a second inner edge, wherein the second outer perimeter side may include: (i) a third closed perimeter portion, (ii) a fourth closed perimeter portion, and (iii) a second perimeter open space defining a second fluid flow passage between the third closed perimeter portion and the fourth closed perimeter portion. The perimeter wall of the housing may form one surface of the second fluid flow passage, e.g., such that fluid flowing through the second fluid flow passage may directly contact the perimeter wall of the housing throughout the second fluid flow passage. The second fluid flow passage may constitute an opening (e.g., an open slot) provided between the outer edge of the second outer perimeter side of the second baffle section and the perimeter wall of the housing. Alternatively, the second perimeter open space may constitute an opening (e.g., a slot) defined through the second baffle section and located proximate to the outer edge of the second outer perimeter side of the second baffle section and/or proximate to the perimeter wall of the housing. The second inner edge of the second baffle section may be spaced apart from the first inner edge of the first baffle section (e.g., to allow fluid to pass between the first and second inner edges and between the baffle sections).

Additionally or alternatively, static mixers (e.g., wafer-style static mixers, static mixers mounted within a fluid pipeline, etc.) in accordance with some examples of this technology may include: (i) a housing including a perimeter wall that defines an open interior space (e.g., wherein the open interior space extends completely through the housing); and (ii) a first baffle section located within the open interior space, the first baffle section including a first surface oriented to receive fluid flow. This first baffle section includes a first outer perimeter region and a first inner region, wherein the first outer perimeter region defines a first outer perimeter fluid passageway. In some examples, this outer perimeter fluid passageway may allow fluid to flow between a first outer perimeter edge of the first baffle section and the perimeter wall of the housing (e.g., in direct contact with the perimeter wall of the housing throughout the first outer perimeter fluid passageway). Alternatively, in some examples, the outer perimeter fluid passageway may constitute a passageway (e.g., a slot) defined through the first baffle section and located proximate to an outer edge of the first outer perimeter region of the first baffle section and/or proximate to the perimeter wall of the housing.

Static mixers of the types described above further may include a second baffle section within the open interior space and located opposite the first baffle section. The first and second baffle sections may be portions of a single baffle component part or they may be formed as separate parts. In some examples of this technology, the second baffle section may include a second surface oriented to receive fluid flow. This second baffle section may include a second outer perimeter region and a second inner region, wherein the second outer perimeter region defines a second outer perimeter fluid passageway. In some examples, this second outer perimeter fluid passageway may allow fluid to flow between a second outer perimeter edge of the second baffle section and the perimeter wall of the housing (e.g., in direct contact with the perimeter wall of the housing throughout the second outer perimeter fluid passageway). Alternatively, in some examples, the second outer perimeter fluid passageway may constitute a passageway (e.g., a slot) defined through the second baffle section and located proximate to an outer edge of the second outer perimeter region of the second baffle section and/or proximate to the perimeter wall of the housing.

In some examples of this technology, the second baffle sections of the types described above will be sized, shaped, and oriented within the open interior space to have mirror symmetry with the first baffle section located within that open interior space.

In some examples of this technology, one or more baffle sections may be provided in which a first surface of the first baffle section (and/or a second surface of a second baffle section) may include an outer surface portion and an inner surface portion. In such structures, the inner surface portion may be angled forward with respect to the outer surface portion in a fluid flow direction of the static mixer. As some more specific examples, the inner surface portion may be angled forward with respect to the outer surface portion at an angle within a range of 20° to 45°, and in some examples, at an angle within a range of 25° to 40° or within a range of 25° to 35°. Additionally or alternatively, in some such structures, the outer surface portion may be oriented substantially perpendicular to the fluid flow direction and/or substantially perpendicular to an axial direction of the static mixer (e.g., oriented at 90°+10° (or even oriented at 90°+5°) to the fluid flow direction and/or the axial direction of the static mixer).

Static mixers in accordance with at least some examples of this technology further may include at least one injection port extending through the housing and opening into the open interior space. Further, in at least some examples of this technology, any one or more injection port may open into the open interior space at a location upstream of the first baffle section and/or at a location upstream of the second baffle section with respect to a fluid flow direction of the static mixer. Additionally or alternatively, in at least some examples of this technology, one or more injection ports may open into the open interior space at a location axially aligned with and/or proximate to a perimeter open space or fluid passageway provided with a baffle section.

Additional aspects of this technology relate to methods of using static mixers in accordance with this technology (e.g., of the types described above and/or of the types described in more detail below), e.g., by placing at least one static mixer in-line between two pipelines, and using the mixer(s) to inject an additive into a fluid stream and/or to mix two or more components (e.g., reactants) within a fluid stream.

Given the general description of features, examples, aspects, structures, processes, and arrangements according to certain aspects and examples of this technology provided above, a more detailed description of specific example baffle structures, static mixers, and/or methods in accordance with this technology follows.

II. Detailed Description of Example Baffle Elements, Static Mixers, and Components and/or Features Thereof According to Aspects of this Technology Referring to the figures and following discussion, examples of baffle elements, static mixers, and components and/or features thereof in accordance with aspects of this technology are described.

Figure 1B:
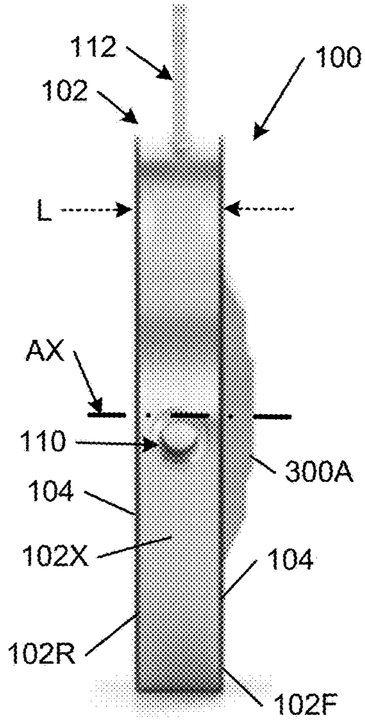
Figure 1C:
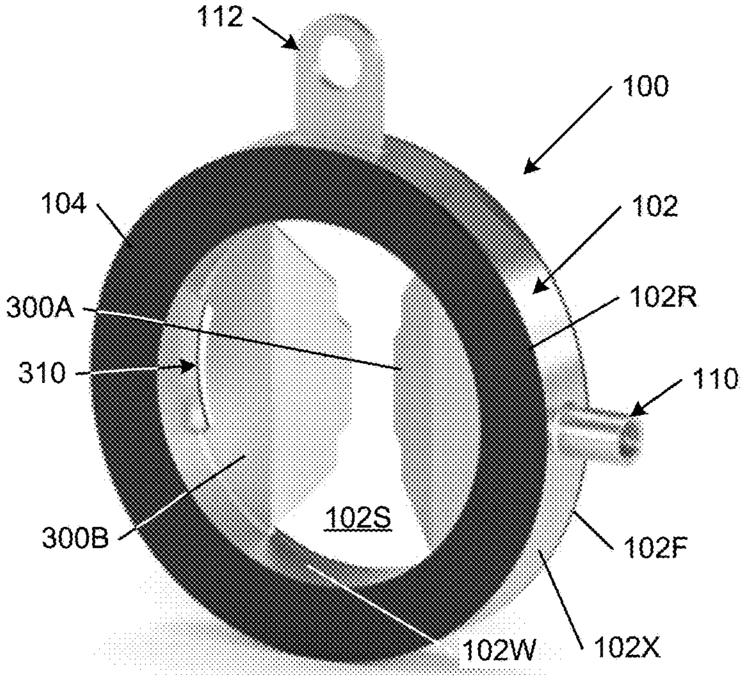

FIGS. 1A-1C illustrate a rear view, a side view, and a rear, side perspective view, respectively, of a wafer-style static mixer 100 in accordance with some examples of this technology. This example wafer-style static mixer 100 includes a housing formed as a base member 102 having a rear side 102R, a front side 102F, an exterior surface 102X, and an interior surface forming an interior perimeter wall 102W. Thus, an open interior space 102S is defined by the perimeter wall 102W (and the base member 102), and this open interior space 102S extends completely through the base member 102. In this illustrated example, the perimeter wall 102W is circular, cylindrically shaped with a round perimeter and an axial direction AX (although other shapes are possible).

The base member 102 may be made from any desired materials without departing from this technology, including: stainless steel, other metals or metal alloys, PVC materials, PVDF materials, PFA materials, PTFE/PFA materials, other plastics, fiberglass, ceramics, or the like. The example static mixer 100 of FIGS. 1A-1C further includes a sealing gasket 104 (e.g., made from rubber, thermoplastics, etc., such as ethylene propylene diene monomer ("EPDM") rubber materials) on each of the front side 102F and the rear side 102R. These sealing gaskets 104 maintain a sealed connection when the static mixer 100 is engaged with pipes 202A and 202B, e.g., as shown in the static mixer in-line arrangement 200 of FIG. 2.

Figure 2:
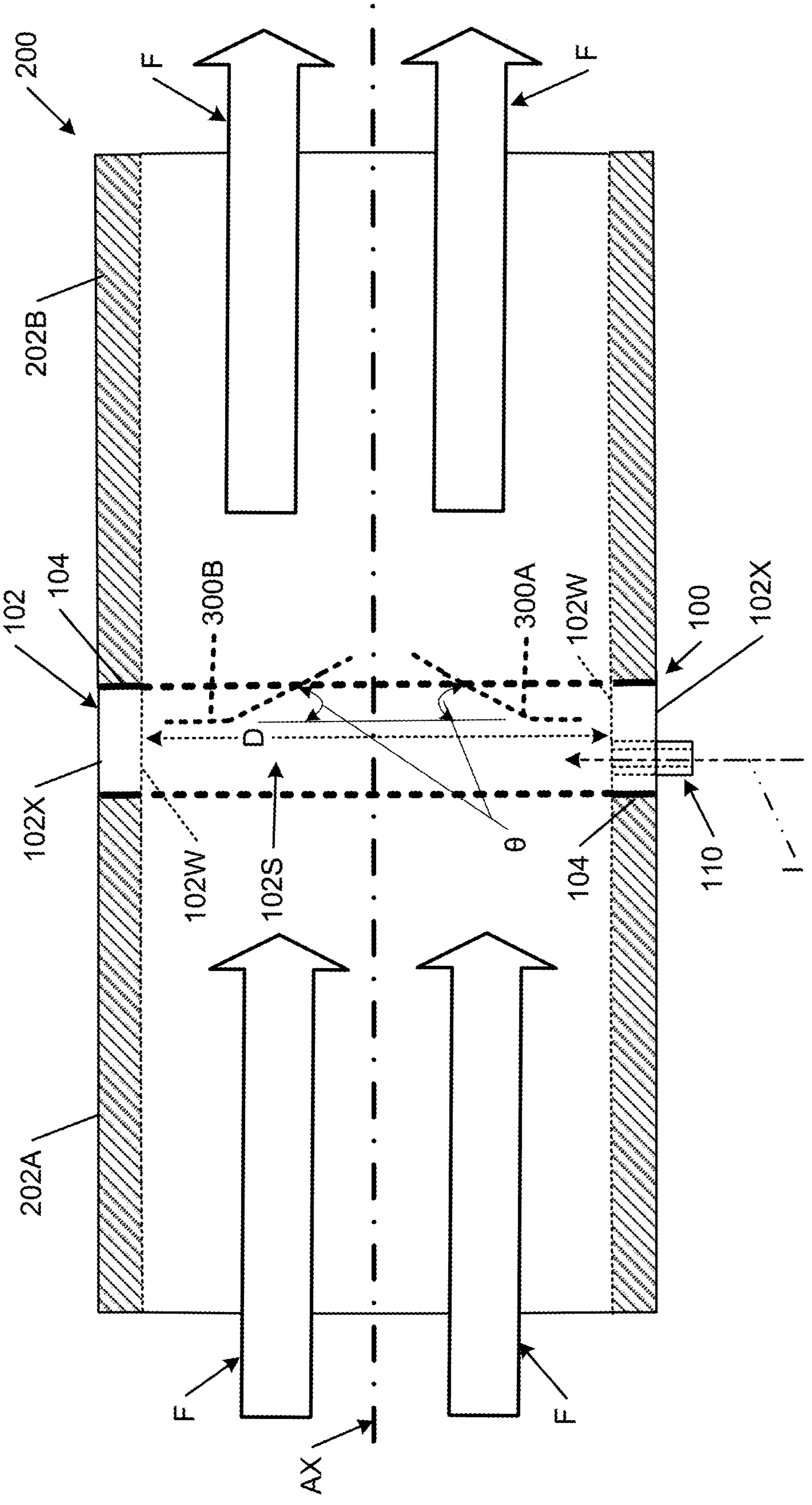
FIG. 2 illustrates an example of a wafer-style static mixer in accordance with some aspects of this technology mounted within a pipeline for use.

FIGS. 1A-2 further show that this example static mixer 100 includes an injection port 110 extending through the base member 102 and opening into the open interior space 102S. While only one injection port 110 is shown in these figures, two or more injection ports could be provided, if desired. The injection port(s) 110 allow additives or reactants to be introduced into the fluid flow stream F (see injection arrow I in FIG. 2). Alternatively, if desired, no injection ports need be provided in the static mixer 100 (e.g., and any desired additives or reactants could be injected through ports in one or more of pipes 202A, 202B in FIG. 2 or upstream from pipe 202A in the arrangement shown in FIG. 2). In this illustrated example static mixer 100, at least one injection port 110 opens into the open interior space 102S at a location upstream of the baffle sections 300A, 300B with respect to a fluid flow direction F (see FIG. 2) or axial direction AX of the static mixer 100. Additionally or alternatively, one or more injection ports 110 may open into the open interior space 102S: (i) at a location axially aligned with (e.g., in front of) and/or proximate to the perimeter fluid flow passageways 310 described in more detail below, or (ii) at a location axially aligned with (e.g., in front of) a solid portion of a baffle section 300A, 300B (e.g., in front of closed perimeter portion 302A and/or 302B described below), e.g., to dispense the injected material onto or very near the baffle section surface 300S. The injected additive or reactant (e.g., introduced via port 110) may then be picked up by the fluid flow F and mixed with the fluid in the fluid flow F. e.g., due to turbulent flow produced by the baffle sections 300A, 300B of the static mixer 100.

Baffle section(s) 300A, 300B may be engaged with the base member 102 in any desired manner, including via mechanical connectors, via scaled connections, via mechanical fasteners, via adhesives, etc. Alternatively, in some examples, the baffle section(s) 300A, 300B may be integrally formed with the base member 102 (e.g., by molding techniques, by printing techniques, etc.) and/or embedded into a material of the base member 102. In some examples, outer edges of the baffle section(s) 300A, 300B may extend into slots or other receptacles formed in the base member 102. The baffle section(s) 300A, 300B may be made from any desired material, including any of the materials described above for base member 102 (although the baffle section(s) 300A, 300B need not be made from the same material as the base member 102 with which it/they are engaged).

FIGS. 1A-1C further show that this example static mixer 100 includes a lifting handle 112, e.g., to enable case of handling, positioning, etc. Any desired type of lifting handle 112 may be provided. Alternatively, two or more lifting handles may be provided or no lifting handle 112 need be provided.

Figure 3C:
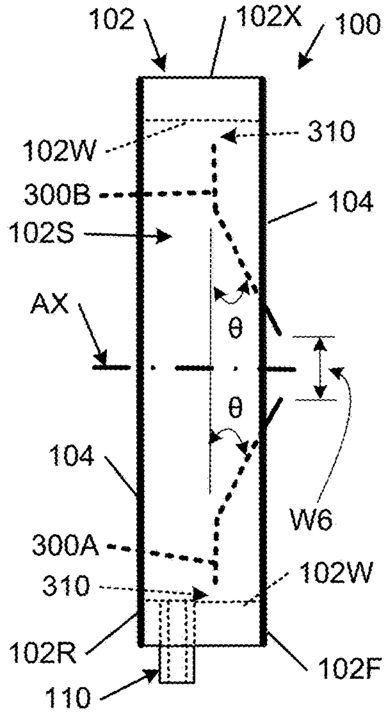
FIGS. 3A, 3B, and 3C provide various views of an example static mixer and components thereof in accordance with some aspects of this technology to illustrate various example features and properties.
Figure 3A:
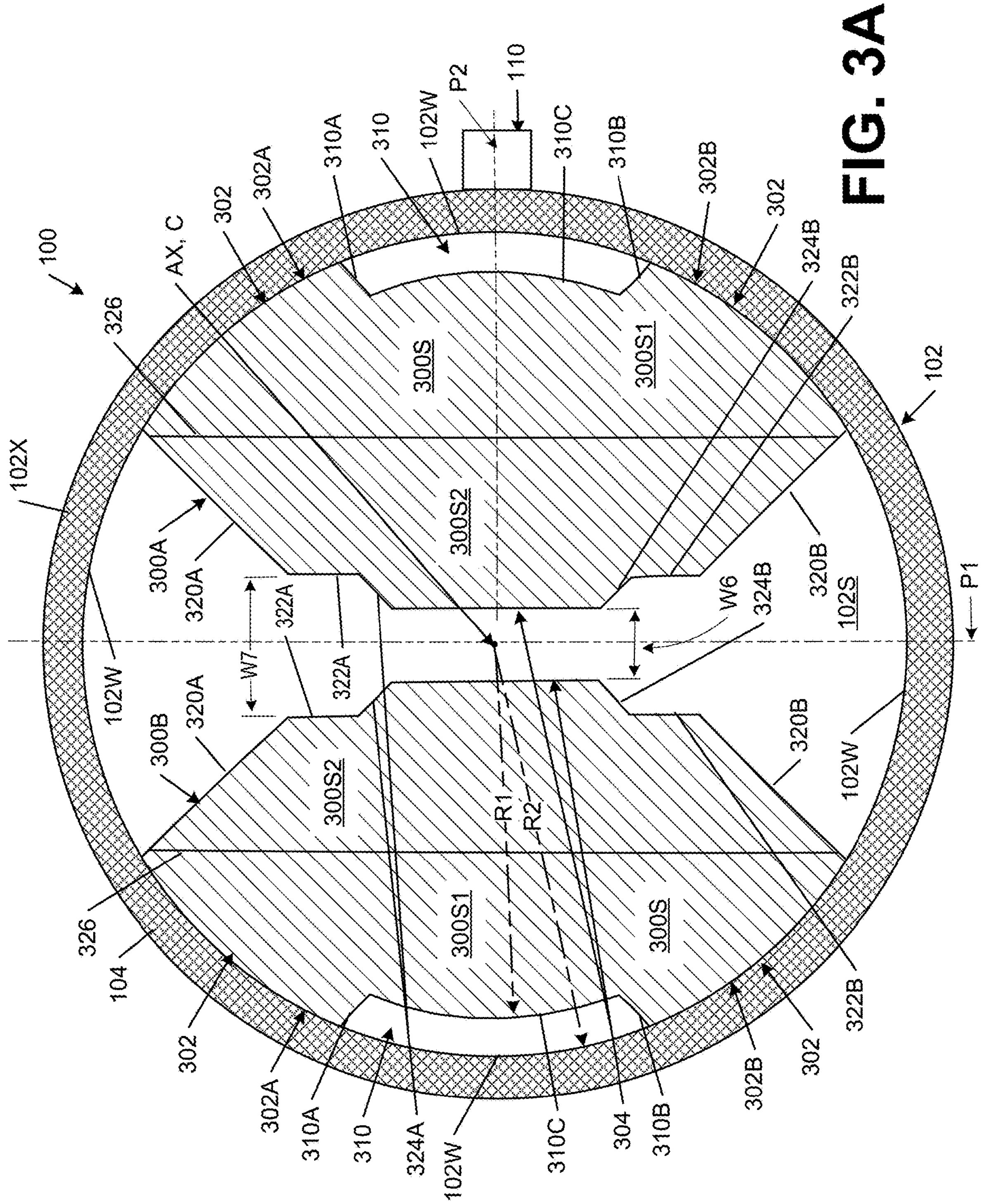
Figure 3B:
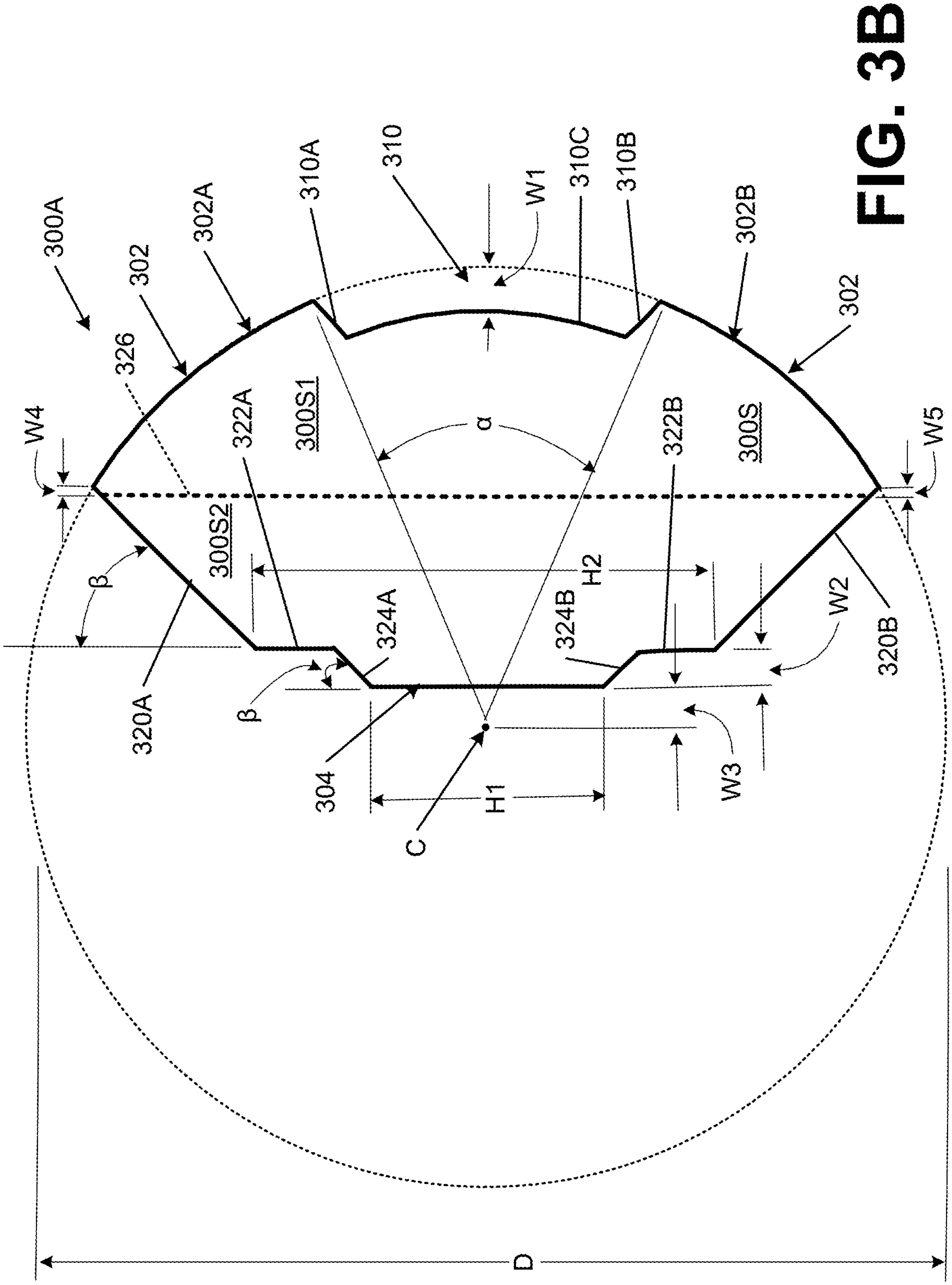

Specific examples and example features of baffle sections 300A, 300B in accordance with at least some aspects of this technology now will be described in conjunction with FIGS. 3A-6. Baffle sections (also called "mixing plates") 300A and 300B of a first example static mixer 100 will be described in conjunction with FIGS. 3A-3C. Where the same reference number is used in FIGS. 3A-3C as used in FIGS. 1A-2, the same or similar parts are being referenced, including any options or alternatives described above for that part, and much of the repetitive description for that same or similar part may be omitted. FIG. 3A provides a rear view of the static mixer 100 looking down its axial direction AX, FIG. 3B provides a view of baffle section 300A with various dimensions and features called out, and FIG. 3C provides a top view of the static mixer 100. While the description below focuses on baffle section 300A, in some examples of this technology (including the example illustrated in FIG. 3A), the second baffle section 300B may be sized, shaped, and oriented within the open interior space 102S to have mirror symmetry with and constitute a mirror image of the first baffle section 300A. Thus, second baffle section 300B may have any one or more (and/or all) of the features described below for similar or corresponding features shown in first baffle section 300A. Where the same reference numbers are used on second baffle section 300B as used for features of the first baffle section 300A, the same or similar parts are being referenced and much of the overlapping and repetitive description may be omitted. Alternatively, if desired, the second baffle section 300B need not have mirror symmetry and/or constitute a mirror image of the first baffle section 300A.

The first baffle section 300A includes a first surface 300S that faces the rear side 102R of the static mixer 100. This first surface 300S extends between a first outer perimeter side 302 of the baffle section 300A and a first inner free edge 304 of the baffle section 300A. The first outer perimeter side 302 of this example includes: (i) a first closed perimeter portion (e.g., portion 302A that directly abuts, extends into, and/or contacts the perimeter wall 102W of the base member 102 and/or otherwise prevents fluid flow through the static mixer 100 at that closed perimeter portion 302A), (ii) a second closed perimeter portion (e.g., portion 302B that directly abuts, extends into, and/or contacts the perimeter wall 102W of the base member 102 and/or otherwise prevents fluid flow through the static mixer 100 at that portion 302B), and (iii) a first perimeter open space 310 defining a first fluid flow passage between the first closed perimeter portion 302A and the second closed perimeter portion 302B. The first perimeter open space 310 defining the first fluid flow passage comprises a perimeter slot in this illustrated example. The first open perimeter space 310, and thus the fluid flow passage of this example, is defined by: (i) a first end 310A, (ii) a second end 310B, (iii) a first interior edge 310C extending between the first end 310A and the second end 310B, and (iv) a portion of the perimeter wall 102W of the base member 102. The first interior edge 310C of this example is spaced inward from the perimeter wall 102W of the base member 102, and it generally follows the contour of the perimeter wall 102W (e.g., such that the slot defined by the first perimeter open space 310 has a substantially constant width W1 from its first end 310A to its second end 310B). In some examples of this technology, first interior edge 310C may follow a radius R1 from center C that is less than the radius R2 of perimeter wall 102W (e.g., wherein R1 is within a range of 0.8×R2 to 0.98×R2, within a range of 0.84×R2 to 0.96×R2, within a range of 0.86×R2 to 0.94×R2, or within a range of 0.88×R2 to 0.92×R2). See FIG. 3A.

In some examples of this technology, the perimeter open space 310 will define an area ($A_{310}$) that is substantially less than the area ($A_{300}$) of the overall baffle section (e.g., 300A, 300B) through which the perimeter open space 310 extends. As some more specific examples, the ratio ($A_{310}/A_{300}$) of the area ($A_{310}$) of the perimeter open space to the area ($A_{300}$) of the overall baffle section (e.g., 300A, 300B) through which the perimeter open space 310 extends may be within the range of 0.03 to 0.2, and in some examples, within the range of 0.03 to 0.175, within the range of 0.03 to 0.15, or even within the range of 0.04 to 0.12.

As shown in FIG. 3A and discussed above, the components and features of the second baffle section 300B are labeled with many of the same reference numbers used for the same or similar parts described above for first baffle section 300A. FIG. 3A further shows that the first inner free edge 304 of the second baffle section 300B is spaced apart from the first inner free edge 304 of the first baffle section 300A (e.g., spaced by dimension W6, discussed in more detail below). The portions of the baffle sections 300A, 300B of this example that include the inner free edges 304 (together with angled connecting walls 324A, 324B) form a generally trapezoidal shape. Also, in this illustrated example, the inner free edges 304 are linear and extend in parallel to one another (although other shapes, arrangements, and/or relative orientations are possible).

Figure 4A:
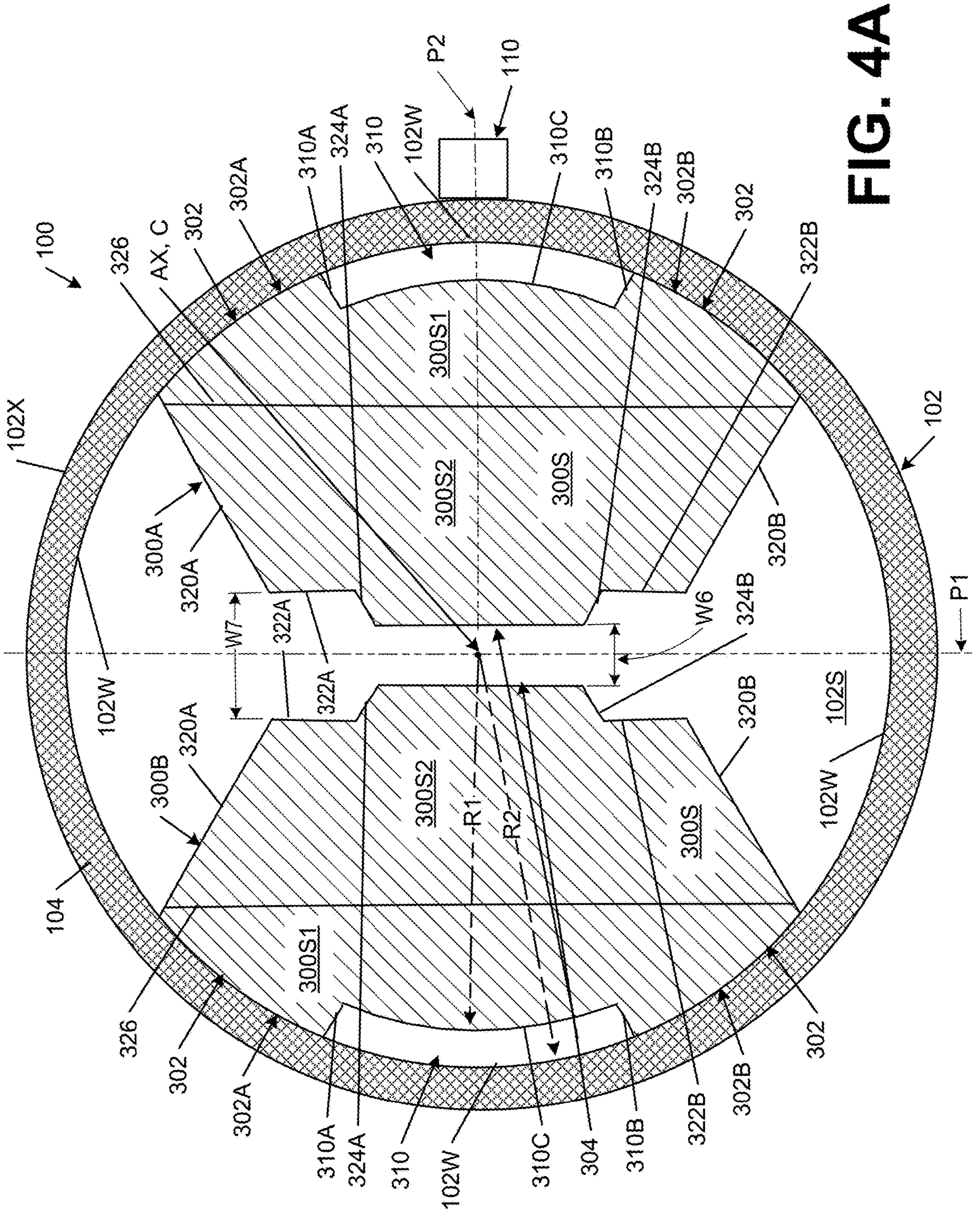
FIGS. 4A and 4B provide various views of another example static mixer and components thereof in accordance with some aspects of this technology to illustrate additional example features and properties.
Figure 4B:
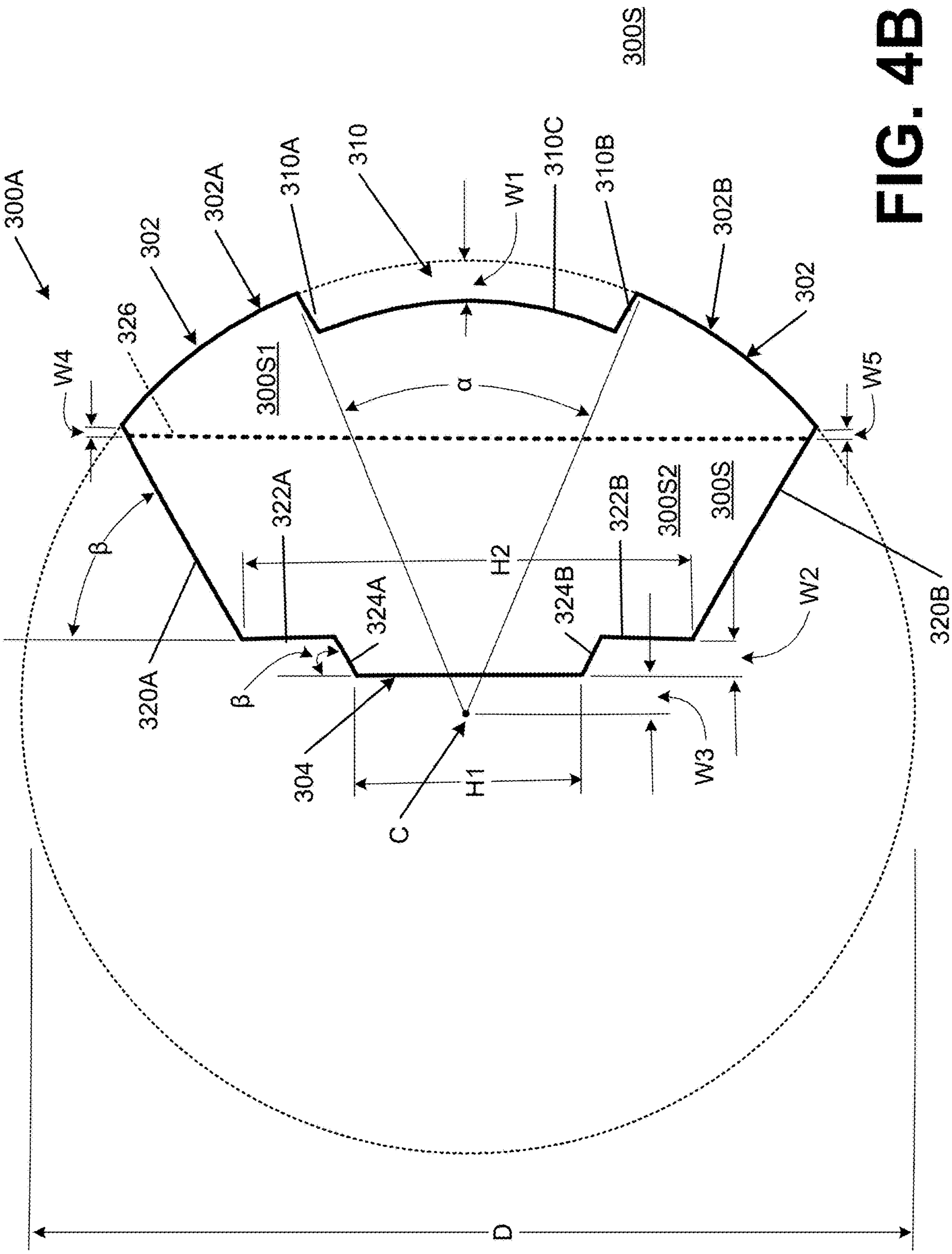

FIGS. 4A and 4B are similar to FIGS. 3A and 3B, respectively, but the static mixer 100 of FIGS. 4A and 4B has somewhat different baffle section 300A, 300B structures. Where the same reference number is used in FIGS. 4A and 4B as used in FIGS. 1A-3C, the same or similar parts are being referenced, including any options or alternatives described above for that part, and much of the repetitive description for that same or similar part may be omitted. FIG. 4A provides a rear view of the static mixer 100 looking down its axial direction AX and FIG. 4B provides a view of baffle section 300A with various dimensions and features called out. Features of the top view of FIG. 3C also may be applied to the static mixer 100 structures of FIGS. 4A and 4B. The baffle sections 300A, 300B of FIGS. 4A and 4B differ from the corresponding parts in FIGS. 3A and 3B in the angle β shown in FIGS. 3B and 4B. In the baffle sections 300A, 300B of FIGS. 3A and 3B, the edges 320A, 320B, 324A, 324B defined by the angle β are more vertical in the orientations shown in the figures as compared to the angle β shown in FIGS. 4A and 4B. This reduces the area of the baffle sections 300A, 300B of FIGS. 4A and 4B as compared to the baffle sections 300A, 300B of FIGS. 3A and 3B (for baffle sections having the same base dimension D).

FIGS. 3A-4B illustrate various dimensions and other features of static mixers 100 and/or baffle structures 300A, 300B in accordance with at least some examples of this technology. These dimensions and other features may take on a variety of values in accordance with some examples of this technology. Some more specific ranges and examples follow.

At least some of these dimensions and other features are described herein as a fraction of a "base dimension" ("D") of the static mixer 100 structure. In at least some examples of this technology, the "base dimension" will constitute an interior diameter D of the wafer mixer 100, e.g., the diameter of inner wall 102W as shown in FIGS. 2, 3B, and 4B. For wafer mixers 100 having non-circular interior surfaces, the base dimension D may comprise a height dimension, a width dimension, a diagonal dimension (e.g., a largest interior diagonal measurement), etc. The base dimension (D) may be any desired size, and in some examples, within a range of 0.5 inch to 24 inches, within a range of 0.5 inch to 22 inches, within a range of 0.75 inch to 20 inches, within a range of 1 inch to 16 inches, within a range of 1 inch to 12 inches, within a range of 1 inch to 10 inches, within a range of 1 inch to 8 inches, within a range of 1 inch to 6 inches, and within a range of 1 inch to 4 inches.

Some more specific examples of dimensions and/or other features of static mixers 100 and/or baffle sections 300A, 300B, e.g., of the types shown in FIGS. 1A-4B, will be described below.

In the illustrated examples, H1 constitutes a dimension of an interior-most free edge 304 of a baffle section 300A, 300B. While FIGS. 1A-4B show straight, linear free edges 304, one or more interior-most free edges 304 may be curved, saw-toothed, wavy, or other shapes.

Dimension H1 of these illustrated examples may be within a range of 0.1×D to 0.4×D, within a range of 0.15×D to 0.35×D, or within a range of 0.2×D to 0.3×D. When non-linear, dimension H1 may correspond with a height or length dimension of an interior-most free edge of a baffle section 300A, 300B, from one end to its opposite end.

The example static mixer 100 and baffle section 300A, 300B structures of FIGS. 1A-4B further include recessed edges 322A, 322B located outward from the interior-most free edge 304. Recessed edges 322A, 322B are connected to opposite ends of the interior-most free edge 304 by connecting walls 324A, 324B, which in these illustrated examples are angled with respect to edges 304, 322A, 322B (e.g., angle β, discussed in more detail below). Thus, free edge 304 and connecting walls 324A, 324B give the interior-most extent of these example baffle sections 300A, 300B a rectangular or trapezoidal shape (e.g., depending on angle β).

Further, in this illustrated example, recessed edges 322A, 322B are generally linear and/or extend substantially parallel to free edges 304, although other shapes and/or angular orientations are possible. In the illustrated examples, dimension H2 constitutes a dimension from one end of recessed edge 322A to the opposite end of recessed edge 322B of a baffle section 300A, 300B. These recessed edges 322A, 322B extend outward beyond the ends of the interior-most free edge 304. Dimension H2 of these examples may be within a range of 0.25×D to 0.75×D, within a range of 0.3×D to 0.7×D, within a range of 0.35×D to 0.65×D, within a range of 0.4×D to 0.6×D, or within a range of 0.45×D to 0.55×D.

As described above, the first interior edge 310C of the first perimeter open space 310 in these examples is spaced inward from the perimeter wall 102W of the base member 102. The first interior edge 310C may take on a variety of shapes (e.g., straight, wavy, curved, sinusoidal, saw-toothed, etc.). Over its length from first end 310A to second end 310B, first perimeter open space 310 may have a maximum width dimension W1. In some examples, the first interior edge 310C of the first perimeter open space 310 may generally follow the contour of the perimeter wall 102W (e.g., such that the slot defined by the first open perimeter space 310 has a substantially constant width W1 from its first end 310A to its second end 310B). As used herein in this context, the width dimension W1 at a specific location along first interior edge 310C is measured as the shortest direct distance across the first open perimeter space 310 from the specific location on the first interior edge 310C to the perimeter wall 102W or to the exterior edge of the open perimeter space (e.g., edge 510D discussed below in conjunction with FIG. 5). Thus, W1 constitutes a maximum width dimension of a perimeter open space 310 or outer perimeter fluid passageway. This maximum width dimension may be within a range of 0.02×D to 0.2×D, within a range of 0.025×D to 0.15×D, within a range of 0.03×D to 0.12×D, within a range of 0.035×D to 0.1×D, or within a range of 0.04×D to 0.08×D.

As shown in FIGS. 3B and 4B, some baffle sections 300A, 300B in accordance with aspects of this technology will have its interior-most free edge 304 extend outward from recessed edges 322A, 322B. W2 as used herein corresponds to a dimension from the interior-most free edge 304 (e.g., at its furthest inward extent) to the recessed edges 322A, 322B (e.g., at its furthest outward extent). In the arrangement shown in FIGS. 3B and 4B, the W2 dimension at the top (from interior-most free edge 304 to the recessed edge 322A) may be the same as or different from the W2 dimension at the bottom (from interior-most free edge 304 to the recessed edge 322B). Either or both of these W2 dimensions may have the following features: W2 may be within a range of 0.01×D to 0.15×D, within a range of 0.02×D to 0.12×D, within a range of 0.025×D to 0.1×D, or within a range of 0.03×D to 0.08×D.

As also shown in FIGS. 3A-4B, some baffle sections 300A, 300B in accordance with aspects of this technology may include a central space between the interior-most free edges 304 of the facing baffle sections 300A, 300B. Thus, the geographic center C of the static mixer 100 (e.g., the center of a circle defined by the perimeter wall 102W of the base member 102) may be located between the interior-most free edges 304 of the facing baffle sections 300A, 300B. W3 represents a dimension from the geographic center C to the interior-most free edge 304 (e.g., at its furthest inward extent). Sec FIGS. 3B and 4B. In some examples, W3 may be within a range of 0.01×D to 0.15×D, within a range of 0.02×D to 0.12×D, within a range of 0.025×D to 0.1×D, or within a range of 0.03×D to 0.08×D.

As described above, the baffle sections 300A, 300B of these examples include base surfaces 300S facing the rear end 102R of the base member 102 and/or oriented to receive fluid flow. These base surfaces 300S interrupt the fluid flow (i.e., at least some fluid flows into the base surfaces 300S as its passes through the base member 102). In at least some examples of this technology, the base surfaces 300S of the baffle section(s) 300A, 300B may include two distinct sections: (i) an outer surface portion 300S1 (or outer perimeter region) located toward the outer perimeter of the baffle section 300A, 300B and (ii) an inner surface portion 300S2 (or inner region) located toward the interior of the baffle section 300A, 300B. In at least some examples of this technology, the inner surface portion 300S2 of the baffle sections 300A, 300B may be angled forward with respect to the outer surface portion 300S1 in a fluid flow direction of the static mixer 100. Note, for example, angle θ shown in FIGS. 2 and 3C (discussed in more detail below). Element 326 in FIGS. 3A, 3B, 4A, and 4B represents a transition region between the outer surface portion 300S1 and the angled inner surface portion 300S2. In at least some examples of this technology, the outer surface portion 300S1 may be oriented substantially perpendicular to the fluid flow direction and/or substantially perpendicular to an axial direction of the static mixer 100 (e.g., oriented at 90°±5° (and in some examples, oriented at 90°±10°) to the fluid flow direction and/or the axial direction of the static mixer 100).

Dimensions W4 and W5 in FIGS. 3B and 4B relate to the location of the transition region 326 between the outer surface portion 300S1 and the angled inner surface portion 300S2 of the baffle section 300A, 300B base surface 300S. As shown in FIGS. 3B and 4B, the baffle sections 300A, 300B's edges 320A, 320B extend from the recessed edges 322A, 322B, respectively, to the outermost extent of the baffle section 300A, 300B (e.g., where the baffle section 300A, 300B meets the perimeter wall 102W of the base member 102). In these illustrated examples, angled edges 320A, 320B are general linear and/or extend substantially parallel to corresponding angled edges 324A. 324B, although other shapes and/or angular orientations are possible. Dimension W4 represents a first baffle surface angle transition location, defined herein as the distance measured from: (a) the location where edge 320A ends (at perimeter wall 102W) to (b) the transition region 326 location at one end of the transition region 326. Similarly, dimension W5 represents a second baffle surface angle transition location, defined herein as the distance measured from: (a) the location where edge 320B ends (at perimeter wall 102W) to (b) the transition region 326 location at the other end of the transition region 326. In a given baffle section 300A, 300B structure, dimensions W4 and W5 may be the same or different. As some more specific examples, W4 and/or W5 may be within a range of 0 to 0.1×D, within a range of 0 to 0.08×D, within a range of 0 to 0.06×D, or within a range of 0 to 0.04×D. The dimensions W4 and/or W5 could be measured inward or outward from the location where edges 320A and/or 320B meet the perimeter wall 102W. Thus, the transition region 326 location could be located at, inside of, or outside of a line connecting: (a) the junction of edge 320A with perimeter wall 102W and (b) the junction of edge 320B with perimeter wall 102W.

As shown in FIGS. 3A, 3B, 4A, and 4B, the angled inner surface portion 300S2 of baffle sections 300A and 300B may have a shape of two stacked trapezoids from the transition region 326 location to the free edge 304, e.g., with (a) one trapezoidal shape formed by edges 320A, 322A, 320B. 322B, and transition region 326 and (b) the second trapezoidal shape formed by edges 324A, 304, 324B extending away from recessed edges 322A, 322B.

In some examples of this technology, the outer surface portion 300S1 will define an area ($A_{300S1}$) and the angled inner surface portion 300S2 will define an area ($A_{300S2}$), and these areas together may combine to provide the total surface area ($A_{300}$) of an overall baffle section (e.g., 300A, 300B) through which one or more perimeter open spaces 310 extend. In some examples, the baffle section's outer surface portion 300S1 area ($A_{300S1}$) (e.g., the area of the portion of the baffle section 300A. 300B that is substantially perpendicular to the fluid flow direction) will be the same as or larger than the angled inner surface portion 300S2's area ($A_{300S2}$). As some additional and more specific examples, in some examples of this technology, the ratio ($A_{300S1}/A_{300S2}$) of the area ($A_{300S1}$) of baffle section's outer surface portion 300S1 to the area ($A_{300S2}$) of the angled inner surface portion 300S2 may be within the range of 0.5 to 2, and in some examples, within the range of 0.6 to 1.8, within the range of 0.75 to 1.6, within the range of 0.8 to 1.5, or even within the range of 0.9 to 1.4.

FIGS. 3A and 4A also provide some example features of the relationship and orientation between two baffle sections 300A, 300B of these example static mixer 100 structures. One feature is represented by dimension W6, the spacing distance between the free edge 304 of baffle section 300A and the free edge 304 of baffle section 300B. In these illustrated examples, W6 may be within a range of 0.02×D to 0.3×D, within a range of 0.04×D to 0.24×D, within a range of 0.05×D to 0.2×D, or within a range of 0.06×D to 0.16×D. The free edges 304 may be equidistant from the center C. Further, each free edge 304 may be spaced from the center C within ranges that are one-half the dimensional values described above (within the ranges for W3 described above).

For baffle section 300A, 300B structures in which the free edges 304 are not linear and/or parallel, the closest spacing between portions of the free edges 304 may lie within the W6 ranges provided above. In other words, at one or more locations along their free edges 304, the opposite free edges 304 of two baffle sections 300A, 300B may fall within the ranges of W6 described above.

As described above, these example baffle sections 300A, 300B include recessed edges 322A, 322B (e.g., which may be linear and/or extend in parallel to each other and/or to the free edge 304). W7 in FIGS. 3A and 4A represents: (i) a spacing distance between the corresponding recessed edges 322A of baffle sections 300A and 300B and/or (ii) a spacing distance between the corresponding recessed edges 322B of baffle sections 300A and 300B. In these illustrated examples, W7 may be within a range of 0.04×D to 0.6×D, within a range of 0.08×D to 0.48×D, within a range of 0.1×D to 0.4×D, or within a range of 0.12×D to 0.32×D. The baffle sections 300A, 300B may be positioned such that the recessed edges 322A and 322B are equidistant from the center C. Further, each recessed edge 322A, 322B may be spaced from the center C within ranges that are one-half the dimensional values described above (within a range of 0.02×D to 0.3×D, within a range of 0.04×D to 0.24×D, within a range of 0.05×D to 0.2×D, or within a range of 0.06×D to 0.16×D).

For baffle section 300A, 300B structures in which the recessed edges 322A, 322B are not linear and/or parallel, the closest spacing between portions of opposite recessed edges 322A and/or 322B may lie within the W7 ranges provided above. In other words, at one or more locations along the recessed edges 322A and/or 322B, the opposite recessed edges 322A and/or 322B of two baffle sections 300A, 300B may fall within the ranges of W7 described above.

FIGS. 3A-4B also illustrate various angular orientations or features of baffle sections 300A, 300B in accordance with at least some examples of this technology. One angle, a, relates to positioning or locations of the fluid passageway or perimeter open space 310 with respect to the center C of the interior perimeter wall 102W of the base member 102. More specifically, as shown in FIGS. 3B and 4B, the first perimeter open space 310 includes a first end 310A and a second end 310B. Rays drawn from the center C to the first end 310A and from the center C to the second end 310B will be separated from one another by an angle α, e.g., of at least 20°, or even at least 30°. As some more specific examples, angle α may be within a range of 20° to 90°, within a range of 24° to 80°, within a range of 30° to 70°, within a range of 30° to 60°, or within a range of 35° to 60°.

FIGS. 3B and 4B also illustrate an angle β. In these illustrated examples, angle β represents one or more of: (a) the angle between recessed edge 322A and angled edge 320A. (b) the angle between recessed edge 322B and angled edge 320B. (c) the angle between free edge 304 and angled connecting wall 324A, and/or (d) the angle between free edge 304 and angled connecting wall 324B. The various β angles within a given baffle section 300A or 300B may be the same or different. As some more specific examples, angle β may be within a range of 5° to 75°, within a range of 10° to 72.5°, within a range of 15° to 70°, within a range of 20° to 70°, within a range of 25° to 70°, within a range of 30° to 70°, or within a range of 35° to 70°.

As described above and shown in FIGS. 2-4B, the fluid-contacting surface 300S of baffle sections 300A, 300B in accordance with some examples of this technology may include two distinct sections that are angled with respect to one another. Thus, surface 300S may include: (i) an outer surface portion 300S1 located toward the outer perimeter of baffle sections 300A, 300B and (ii) an inner surface portion 300S2 located toward the interior of baffle sections 300A, 300B. The inner surface portion 300S2 of the baffle sections 300A, 300B may be angled forward with respect to the outer surface portion 300S1 in a fluid flow direction of the static mixer 100 at transition region 326. As noted above, the outer surface portion 300S1 may be oriented substantially perpendicular to the fluid flow direction and/or substantially perpendicular to an axial direction of the static mixer 100 (e.g., oriented at 90°±5° or even oriented at 90°±10° to the fluid flow direction and/or the axial direction of the static mixer 100). The inner surface portion 300S2 may be oriented at an angle @ with respect to the outer surface portion 300S1, e.g., as shown in FIGS. 2 and 3C. The angle @ may take on values within the following ranges: within a range of 5° to 60°, within a range of 10° to 55°, within a range of 15° to 50°, within a range of 20° to 45°, within a range of 25° to 40°.

As some even more specific examples, the structures of FIGS. 3A-3C (Example 1) and FIGS. 4A and 4B (Example 2) may have the dimensions and features shown in Table 1 below (e.g., ±10%):

TABLE 1

| Feature | Example 1 | Example 2 |
|---|---|---|
| H1 | 0.25 × D | 0.25 × D |
| H2 | 0.5 × D | 0.5 × D |

TABLE 1-continued

| Feature | Example 1 | Example 2 |
|---|---|---|
| W1 | 0.05 × D | 0.05 × D |
| W2 | 0.04 × D | 0.04 × D |
| W3 | 0.044 × D | 0.035 × D |
| W4 | 0.01 × D | 0.01 × D |
| W5 | 0.01 × D | 0.01 × D |
| W6 | 0.087 × D | 0.07 × D |
| W7 | 0.167 × D | 0.15 × D |
| α | 45° | 45° |
| β | 45° | 60° |
| θ | 30° | 30° |

While not a requirement, as noted above, in at least some static mixers 100 in accordance with this technology, the second baffle section 300B will be sized, shaped, and oriented within the open interior space 102S to have mirror symmetry with the first baffle section 300A. Thus, the baffle sections 300A, 300B may have mirror symmetry about a plane P1 oriented through the center C shown in FIGS. 3A and 4A. Additionally or alternatively, in at least some examples of this technology, individual baffle sections 300A and/or 300B also may have mirror symmetry, e.g., about a plane P2 bisecting the free edge 304 and the fluid passageway or first perimeter open space 310 as shown in FIGS. 3A and 4A.

Figure 5:
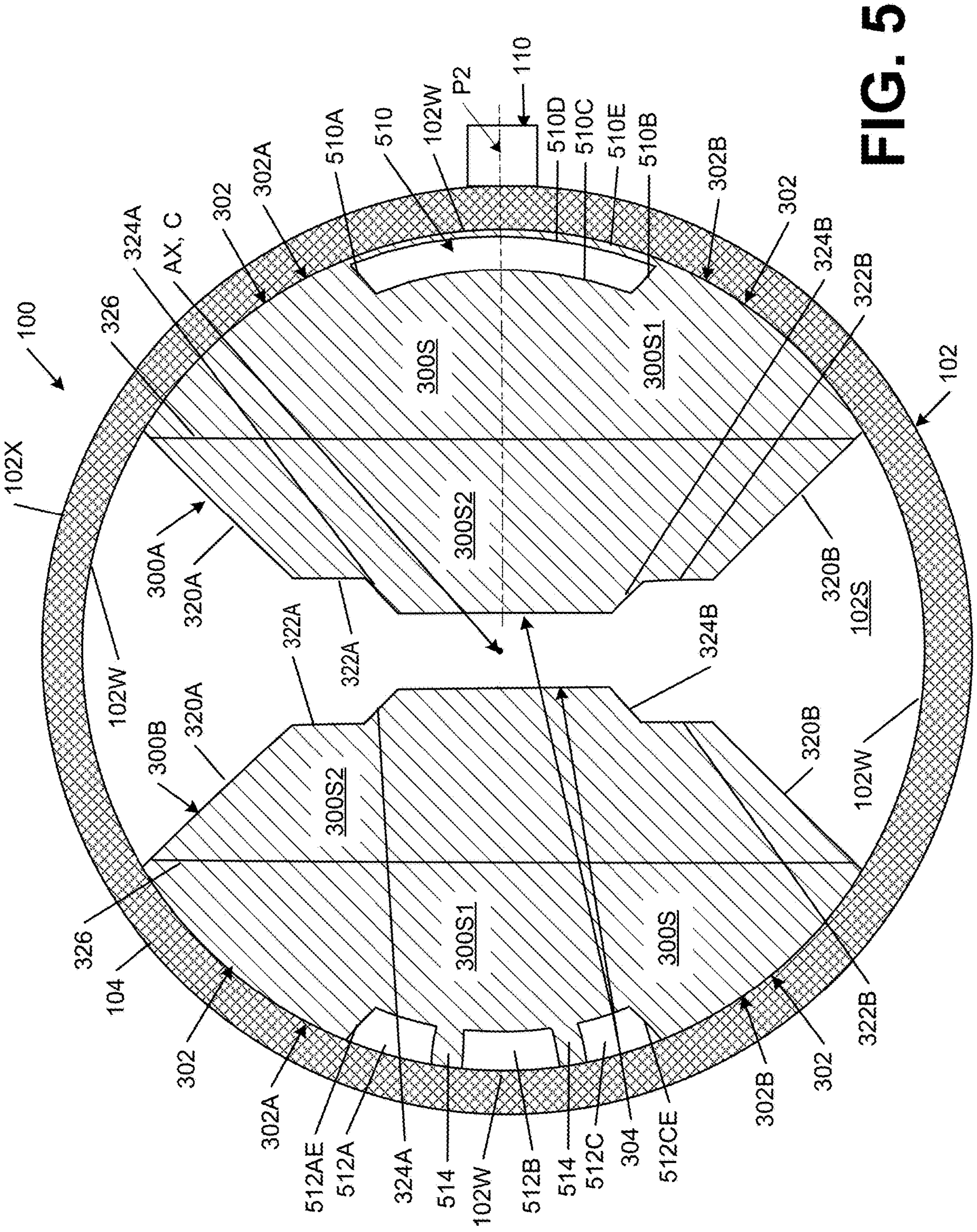
FIGS. 5 and 6 illustrate other example static mixers and components thereof in accordance with some aspects of this technology to illustrate example features and properties.

Many variations in features of static mixers may be made in accordance with at least some examples of this technology. FIG. 5 illustrates a rear view of a static mixer 100 similar to those shown in FIGS. 1A-4B, but the static mixer 100 of FIG. 5 includes some variations. Where the same reference number is used in FIG. 5 as used in FIGS. 1A-4B above, the same or similar parts are being referenced, and much of the overlapping and repetitive description may be omitted. The static mixer 100 of FIG. 5 may have any of the features described above for the static mixers 100 of FIGS. 1A-4B, including any of dimensions, ranges, and/or variations described above for features D, R1, R2, H1, H2, W1, W2, W3, W4, W5, W6, W7, angle α, angle β, and/or angle θ. The description below will focus on at least some of the ways the static mixer 100 of FIG. 5 differs from the other specific static mixers shown in FIGS. 1A-4B.

One difference relates to the fact that baffle section 300A in the static mixer example of FIG. 5 is not a mirror image (and does not have mirror symmetry) with the baffle section 300B. Rather, the perimeter fluid passageways through the baffle sections 300A and 300B differ from one another and differ from the perimeter fluid passageways or first perimeter open spaces 310 shown in the examples of FIGS. 1A-4B. The fluid passageway or first perimeter open space 510 in baffle section 300A of FIG. 5 is similar in size and shape to the fluid passageway or first perimeter open spaces 310 shown in FIGS. 1A-4B, but the fluid passageway or first perimeter open space 510 is spaced inward somewhat from the perimeter wall 102W of the base member 102. Thus, perimeter fluid passageway or first perimeter open space 510 in baffle section 300A of FIG. 5 includes: (i) a first end 510A, (ii) a second end 510B, a first interior edge 510C extending between the first end 510A and the second end 510B, and (iv) a first exterior edge 510D extending between the first end 510A and the second end 510B. At least 50% of first exterior edge 510D in this example is located proximate to the outermost edge of the baffle section 300A and proximate to the interior perimeter wall 102W of the base member 102. Rather than defining an open space between the baffle section 300A's outer perimeter edge and the perimeter wall 102W of the base member 102, the perimeter fluid passageway or first perimeter open space 510 in baffle section 300A of FIG. 5 constitutes a through hole provided through the baffle section 300A.

First end 510A, second end 510B, first interior edge 510C, and overall fluid passageway 510 may have any size, dimensional, orientation, and/or spacing features described above for components 310A. 310B, 310C, and 310, respectively. In at least some examples of this technology, at least some portion of first exterior edge 510D may be located in close proximity to the perimeter wall 102W of the base member 102. The term "in close proximity" as used herein in this context means at least 50% of the first exterior edge 510D will be located within 0.02×D from the perimeter wall 102W (wherein D is a base dimension (e.g., diameter) of the interior perimeter wall 102W). As some additional or alternative potential features, the first exterior edge 510D may follow a surface contour of the perimeter wall 102W of the base member 102 and/or may follow a surface contour of first interior edge 510C. Together, first interior edge 510C and first exterior edge 510D may create a fluid passageway and/or perimeter open space having any of the width W1 and/or angle α features described for the examples above, just with a portion (e.g., a small band 510E) of baffle section 300A material located between the first exterior edge 510D and the perimeter wall 102W.

If desired, baffle section 300B of FIG. 5 could have a fluid passageway or first perimeter open space 510 having the same structure (e.g., a mirror image) of the fluid passageway or first perimeter open space 510 shown in baffle section 300A. In such a structure, baffle section 300B may constitute a mirror image of (and have mirror symmetry with respect to) baffle section 300B.

In the example static mixer 100 shown in FIG. 5, however, baffle section 300B includes multiple fluid passageways or multiple perimeter open spaces 512A-512C separated by portions 514 of the baffle section 300B. The individual fluid passageways or perimeter open spaces 512A-512C may have the width W1 features described above. Additionally or alternatively, each individual fluid passageway or perimeter open space 512A-512C may extend for an angular extent (e.g., akin to angle α described above) within a range of 5° to 45°, within a range of 7.5° to 40°, within a range of 10° to 35°. Additionally or alternatively, in some examples of this technology, the overall extent of the multiple fluid passageways or multiple perimeter open spaces 512A-512C (e.g., from the end 512AE of one fluid passageway 512A to the opposite end 512CE of another, spaced fluid passageway 512C) may be within the ranges of angle α described above (e.g., within a range of 20° to 90°, within a range of 24° to 80°, within a range of 30° to 70°, within a range of 30° to 60°, or within a range of 35° to 60°). Also, while FIG. 5 shows each individual fluid passageway or perimeter open space 512A-512C defined in part by the perimeter wall 102W of the base member 102, the baffle section 300B could include an exterior fluid passageway edge, e.g., akin to first exterior edge 510D, for any one or more of fluid passageway or perimeter open space 512A-512C. Also, while three fluid passageways or perimeter open spaces 512A-512C are shown in FIG. 5, any number (e.g., from 2 to 8, from 2 to 6, from 2 to 4) could be provided, if desired.

If desired, baffle section 300A could have multiple fluid passageways or multiple perimeter open spaces 512A-512C having the same structure (e.g., a mirror image) of the multiple fluid passageways or multiple perimeter open spaces 512A-512C shown in baffle section 300B. In such a structure, baffle section 300A may constitute a mirror image of (and have mirror symmetry with respect to) baffle section 300A. Additionally or alternatively, if desired, any one or more of the fluid passageways or perimeter open spaces 310 shown in the examples of FIGS. 1A-4B could be replaced with fluid passageways or perimeter open spaces of the types shown and described above for fluid passageways or perimeter open spaces 510, 512A-512C, in some examples of this technology.

Figure 6:
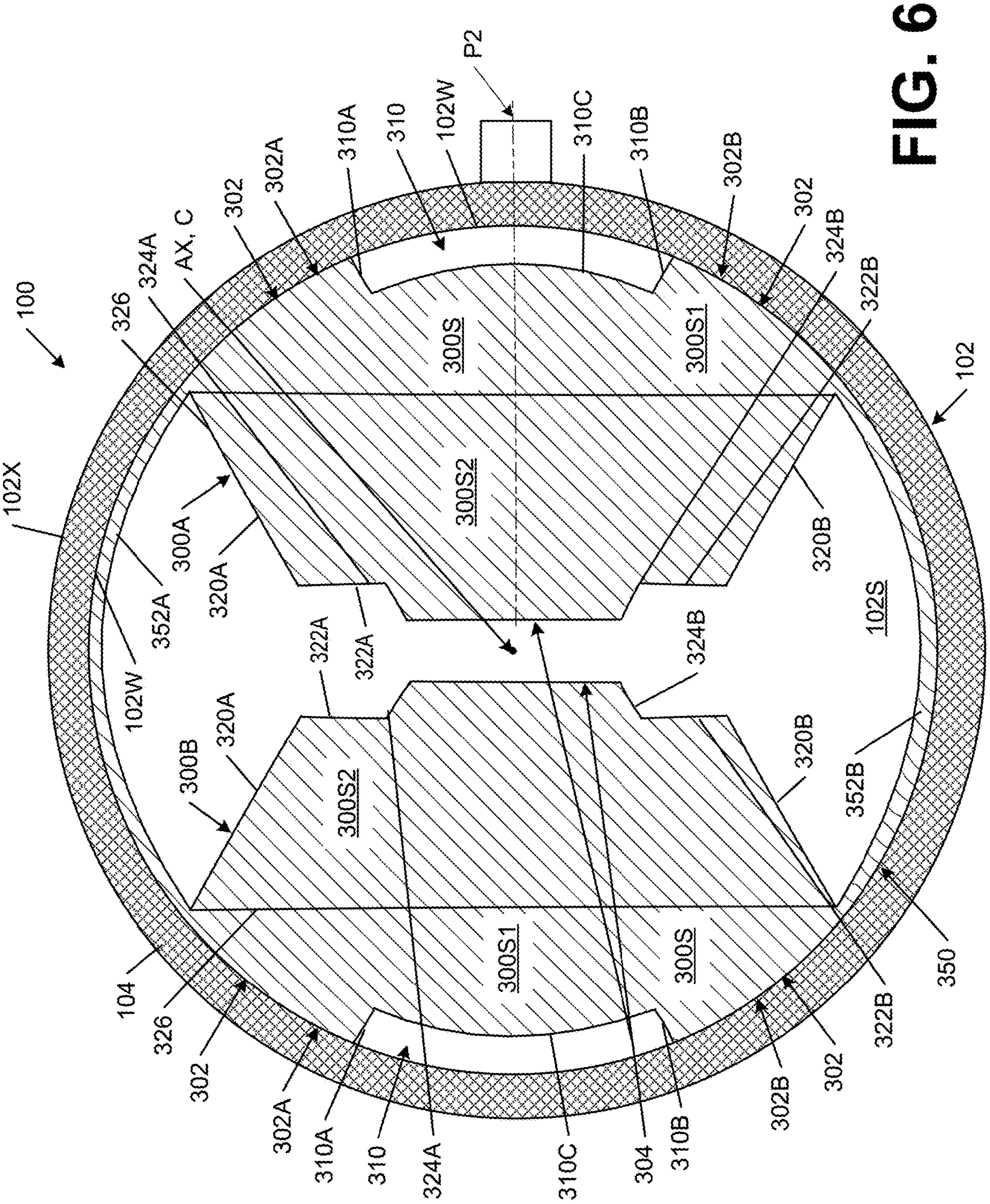

FIG. 6 illustrates a rear view of another static mixer 100 similar to those shown in FIGS. 1A-5, but the static mixer 100 of FIG. 6 includes some variations. Where the same reference number is used in FIG. 6 as used in FIGS. 1A-5 above, the same or similar parts are being referenced, and much of the overlapping and repetitive description may be omitted. The static mixer 100 of FIG. 6 may have any of the features described above for the static mixers 100 of FIGS. 1A-5, including any of dimensions, ranges, and/or variations described above for features D. R1, R2, H1, H2, W1, W2, W3, W4, W5, W6, W7, angle α, angle β, and/or angle θ. The description below will focus on at least some of the ways the static mixer 100 of FIG. 6 differs from the other specific static mixers shown in FIGS. 1A-5.

In the examples of FIGS. 1A-5, the baffle sections 300A and 300B are provided as separate components, e.g., engaged with the base member 102. In the example of FIG. 6, however, baffle sections 300A and 300B are included as part of a single baffle component 350. As shown in FIG. 6, in this illustrated example, baffle section 300A is connected to baffle section 300B by perimeter sections 352A, 352B of the baffle component 350. Alternatively, rather than two baffle perimeter sections 352A, 352B, either one could be omitted, if desired. If desired, the baffle perimeter sections 352A, 352B could be recessed into or embedded in perimeter wall 102W (and potentially not visible in a direct rear view).

In at least some examples of this technology, one or more perimeter sections (e.g., of the types shown at reference numbers 352A and 352B) also may be provided in any of the example structures shown in FIGS. 1A-5, thereby making the baffle sections 300A, 300B shown in those figures part of a single baffle component (e.g., akin to component 350 shown in FIG. 6). Additionally or alternatively, if desired, the static mixer 100 structure shown in FIG. 6 may include fluid passageways or perimeter open spaces of any one or more of the types shown at reference numbers 310, 510, and/or 512A-512C in FIGS. 1A-5.

The examples illustrated in FIGS. 1A-6 comprise wafer-style static mixers 100, e.g., static mixers 100 formed as a separate component that can be mounted to two separate pipes 202A and 202B, e.g., as shown in FIG. 2. In such structures, the base member 102 of the wafer-style static mixer 100 may have any desired length L in the axial direction AX from rear surface 102R to forward surface 102F (see dimension L in FIG. 1B). Thus, the forward edge(s) of the baffle section(s) 300A. 300B may extend beyond the forward surface 102F (e.g., as shown in FIGS. 1B and 3C), or the forward edge(s) of the baffle section(s) 300A, 300B may be located within the interior space 102S defined by the static mixer 100.

Figure 7:
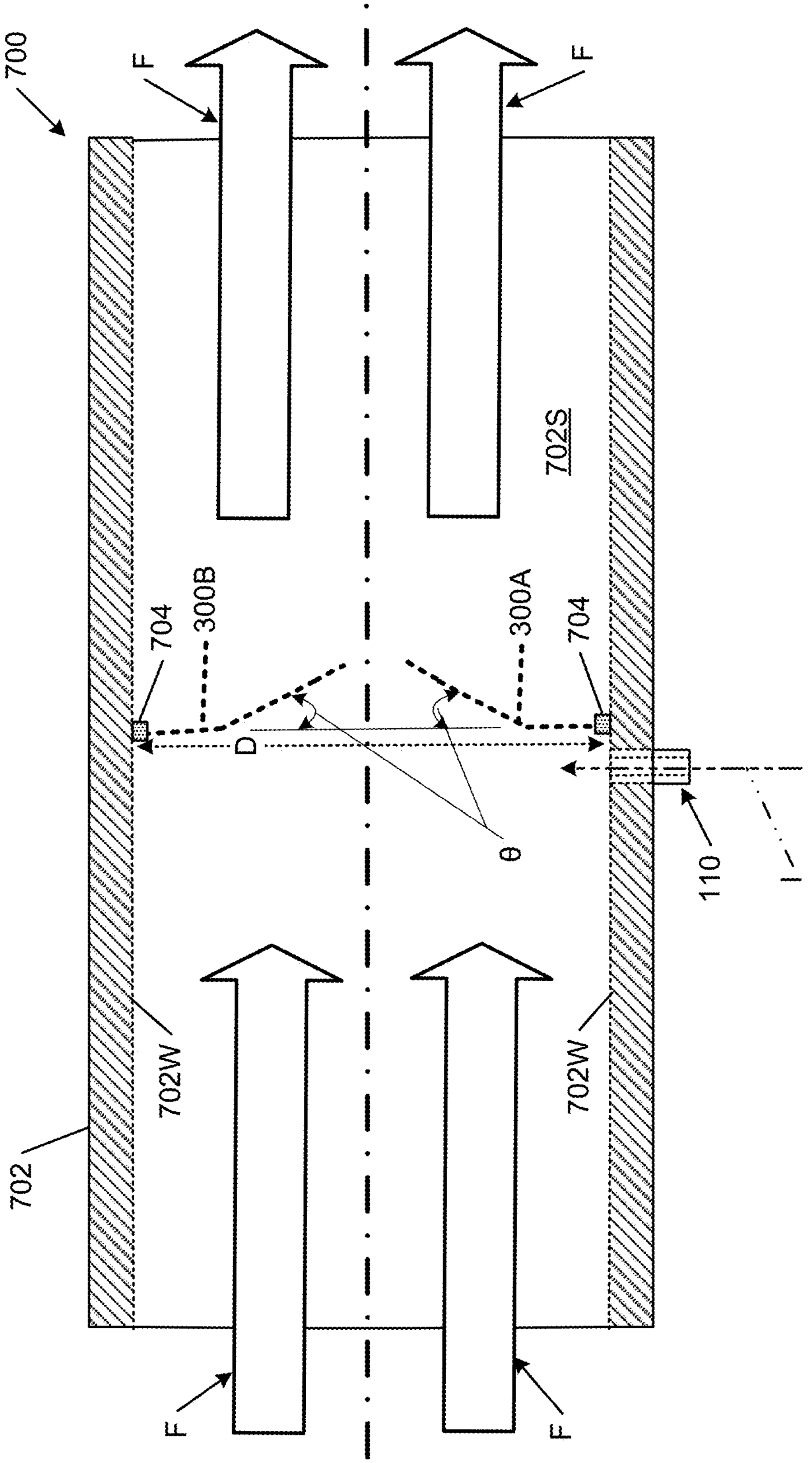
FIG. 7 illustrates another example static mixer arrangement in which one or more mixer baffle elements are mounted directly within an interior of a fluid line.

As another option, in some examples of this technology as shown in FIG. 7, static mixers 700 in accordance with aspects of this technology may comprise baffle section(s) 300A and/or 300B mounted directly within an open interior space 702S of a fluid pipe 702. In such static mixers 700, the fluid pipe 702 itself may be considered the "housing" for supporting the static mixer 700's baffle section(s) 300A, 300B. The baffle section(s) 300A, 300B in the example static mixer 700 of FIG. 7 may have any of the structures, features, arrangements, orientations, options, and alternatives for baffle sections(s) 300A, 300B described above in conjunction with FIGS. 1A-6. The fluid pipe 702 may be equipped with an injection port 110, e.g., having any of the structures, features, arrangements, orientations, options, and alternatives for injection port 110 described above in conjunction with FIGS. 1A-6.

In the example of FIG. 7, the baffle section(s) 300A, 300B may be secured (e.g., as one part or two parts) directly to the interior perimeter wall 702W of the fluid pipe 702. This securing step may be accomplished in any desired manner, e.g., through the use of one or more of: mechanical fasteners (e.g., bolts, screws, rivets, brackets, etc.) as securing components; welding techniques as securing components; adhesives as securing components; etc. The baffle section(s) 300A, 300B may include an outer perimeter flange shaped to engage the interior perimeter wall 702W, and the securing components may secure to this flange. The flange (if present) and/or the outer edge of the baffle section(s) 300A, 300B may be recessed into the interior perimeter wall 702W, if desired. Additionally or alternatively, if desired, the baffle section(s) 300A, 300B may include a gasket or seal structure 704 at the outer perimeter edge that contacts or connects to the perimeter wall 702W to prevent fluid from flowing between the outer perimeter edge of the baffle section(s) 300A, 300B and the perimeter wall 702W other than through the perimeter fluid flow passageway(s) 310 (and/or 510, 512A-512C) provided with the baffle section(s) 300A, 300B. Alternatively, such a gasket or seal structure 704 could be provided as a separate part.

III. Conclusion

The present technology is disclosed above and in the accompanying drawings with reference to a variety of embodiments. The purpose served by the disclosure, however, is to provide an example of the various features and concepts related to the technology, not to limit its scope. One skilled in the relevant art will recognize that numerous variations and modifications may be made to the embodiments described above without departing from the scope of the present invention, as defined by the appended claims.

For the avoidance of doubt, the present application includes at least the subject matter described in the following numbered Clauses:

Clause 1. A static mixer, comprising:

a housing including a perimeter wall that defines an open interior space; and a first baffle section located within the open interior space, the first baffle section including a first surface that extends between a first outer perimeter side of the first baffle section and a first inner edge of the first baffle section, wherein the first outer perimeter side includes: (i) a first closed perimeter portion extending to the perimeter wall, (ii) a second closed perimeter portion extending to the perimeter wall, and (iii) a first perimeter open space defining a first fluid flow passage between the first closed perimeter portion and the second closed perimeter portion.

Clause 2. The static mixer according to Clause 1, further comprising: a second baffle section located within the open interior space and opposite the first baffle section.

Clause 3. The static mixer according to Clause 1, further comprising: a second baffle section located within the open interior space, the second baffle section including a second surface that extends between a second outer perimeter side of the second baffle section and a second inner edge of the second baffle section, wherein the second outer perimeter side includes: (i) a third closed perimeter portion extending to the perimeter wall, (ii) a fourth closed perimeter portion extending to the perimeter wall, and (iii) a second perimeter open space defining a second fluid flow passage between the third closed perimeter portion and the fourth closed perimeter portion, and wherein the second inner edge is spaced apart from the first inner edge.

Clause 4. The static mixer according to Clause 3, wherein the second baffle section is sized, shaped, and oriented within the open interior space to have mirror symmetry with the first baffle section located within the open interior space.

Clause 5. The static mixer according to any one of Clauses 1 to 4, wherein the first perimeter open space includes a first end, a second end, and a first interior edge extending between the first end and the second end, wherein the first interior edge is spaced inward from the perimeter wall of the housing.

Clause 6. The static mixer according to any one of Clauses 1 to 4, wherein the first perimeter open space includes a first end, a second end, a first interior edge extending between the first end and the second end, and a first exterior edge extending between the first end and the second end, wherein the first exterior edge is located in close proximity to the perimeter wall of the housing.

Clause 7. The static mixer according to Clause 5 or 6, wherein the first interior edge of the first perimeter open space follows a surface contour of the perimeter wall of the housing.

Clause 8. The static mixer according to Clause 5 or 6, wherein the perimeter wall of the housing defines a diameter D, and wherein a maximum width dimension of the first perimeter open space directly from the first interior edge to the perimeter wall is within a range of 0.02×D to 0.2×D.

Clause 9. The static mixer according to Clause 5 or 6, wherein the perimeter wall of the housing defines a diameter D, and wherein a maximum width dimension of the first perimeter open space directly from the first interior edge to the perimeter wall is within a range of 0.025×D to 0.15×D.

Clause 10. The static mixer according to Clause 5 or 6, wherein the perimeter wall of the housing defines a diameter D, and wherein a maximum width dimension of the first perimeter open space directly from the first interior edge to the perimeter wall is within a range of 0.03×D to 0.12×D.

Clause 11. The static mixer according to Clause 5 or 6, wherein the perimeter wall of the housing defines a diameter D, and wherein a maximum width dimension of the first perimeter open space directly from the first interior edge to the perimeter wall is within a range of 0.035×D to 0.1×D.

Clause 12. The static mixer according to Clause 5 or 6, wherein the perimeter wall of the housing defines a diameter D, and wherein a maximum width dimension of the first perimeter open space directly from the first interior edge to the perimeter wall is within a range of 0.04×D to 0.08×D.

Clause 13. The static mixer according to any one of Clauses 1 to 4, wherein the perimeter wall of the housing defines a circular surface, wherein the first perimeter open space includes a first end and a second end, and wherein the first end and the second end are separated from one another by an angle of at least 30° measured from a center of the circular surface.

Clause 14. The static mixer according to any one of Clauses 1 to 4, wherein the perimeter wall of the housing defines a circular surface, wherein the first perimeter open space includes a first end and a second end, and wherein the first end and the second end are separated from one another by an angle of 30° to 60° measured from a center of the circular surface.

Clause 15. The static mixer according to any one of Clauses 1 to 14, wherein the first surface includes an outer surface portion and an angled inner surface portion, and wherein the angled inner surface portion is angled forward with respect to the outer surface portion in a fluid flow direction of the static mixer.

Clause 16. The static mixer according to Clause 15, wherein the angled inner surface portion is angled forward with respect to the outer surface portion at an angle within a range of 20° to 45°, or at an angle within a range of 25° to 40°.

Clause 17. The static mixer according to Clause 15 or 16, wherein the outer surface portion defines an area $A_{300S1}$, wherein the angled inner surface portion defines an area $A_{300S2}$, and wherein a ratio $A_{300S1}/A_{300S2}$ of the area $A_{300S1}$ of the outer surface portion to the area $A_{300S2}$ of the angled inner surface portion is within a range of 0.5 to 2, within a range of 0.6 to 1.8, within a range of 0.75 to 1.6, within a range of 0.8 to 1.5, or within a range of 0.9 to 1.4.

Clause 18. The static mixer according to any one of Clauses 15 to 17, wherein the outer surface portion is oriented substantially perpendicular to the fluid flow direction of the static mixer.

Clause 19. The static mixer according to any one of Clauses 1 to 18, further comprising a first injection port extending through the housing and opening into the open interior space.

Clause 20. The static mixer according to Clause 19, wherein the first injection port opens into the open interior space at a location upstream of the first baffle section with respect to a fluid flow direction of the static mixer.

Clause 21. The static mixer according to any one of Clauses 1 to 20, wherein the first inner edge of the first baffle section includes: (i) a first free edge portion having a first end and a second end, (ii) a first recessed edge portion, (iii) a first angled portion extending between the first end of the first free edge portion and the first recessed edge portion, (iv) a second recessed edge portion, and (v) a second angled portion extending between the second end of the first free edge portion and the second recessed edge portion.

Clause 22. The static mixer according to Clause 21, wherein the first baffle section further includes: (i) a third angled portion extending from the first recessed edge portion to the first closed perimeter portion and (ii) a fourth angled portion extending from the second recessed edge portion to the second closed perimeter portion.

Clause 23. The static mixer according to Clause 22, wherein the third angled portion is angled with respect to the first recessed edge portion at an angle within a range of 30° to 70°, and wherein the fourth angled portion is angled with respect to the second recessed edge portion at an angle within a range of 30° to 70°; or wherein the third angled portion is angled with respect to the first recessed edge portion at an angle within a range of 35° to 70°, and wherein the fourth angled portion is angled with respect to the second recessed edge portion at an angle within a range of 35° to 70°.

Clause 24. The static mixer according to any one of Clauses 1-23, wherein the first perimeter open space defines an area $A_{310}$, wherein the first baffle section defines an area $A_{300}$, and wherein a ratio $A_{310}/A_{300}$ of the area $A_{310}$ of the first perimeter open space to the area $A_{300}$ of the first baffle section is within a range of 0.03 to 0.2, within a range of 0.03 to 0.175, within a range of 0.03 to 0.15, or within a range of 0.04 to 0.12.

Clause 25. A static mixer, comprising:

a housing including a perimeter wall that defines an open interior space; and a first baffle section located within the open interior space, the first baffle section including a first surface oriented to receive fluid flow, wherein the first baffle section includes a first outer perimeter region and a first inner region, wherein the first outer perimeter region defines a first outer perimeter fluid passageway that allows fluid to flow between a first outer perimeter edge of the first baffle section and the perimeter wall of the housing.

Clause 26. The static mixer according to Clause 25, further comprising: a second baffle section located within the open interior space and opposite the first baffle section.

Clause 27. The static mixer according to Clause 25, further comprising: a second baffle section located within the open interior space, the second baffle section including a second surface oriented to receive fluid flow, wherein the second baffle section includes a second outer perimeter region and a second inner region, wherein the second outer perimeter region defines a second outer perimeter fluid passageway that allows fluid to flow between a second outer perimeter edge of the second baffle section and the perimeter wall of the housing.

Clause 28. The static mixer according to Clause 27, wherein the second baffle section is sized, shaped, and oriented within the open interior space to have mirror symmetry with the first baffle section located within the open interior space.

Clause 29. The static mixer according to any one of Clauses 25 to 28, wherein the first outer perimeter fluid passageway includes a first end, a second end, and a first interior edge extending between the first end and the second end, wherein the first interior edge is spaced inward from the perimeter wall of the housing.

Clause 30. The static mixer according to Clause 29, wherein the first interior edge of the first outer perimeter fluid passageway follows a surface contour of the perimeter wall of the housing.

Clause 31. The static mixer according to Clause 29, wherein the perimeter wall of the housing defines a diameter D, and wherein a maximum width dimension of the first outer perimeter fluid passageway directly from the first interior edge to the perimeter wall is within a range of 0.02×D to 0.2×D.

Clause 32. The static mixer according to Clause 29, wherein the perimeter wall of the housing defines a diameter D, and wherein a maximum width dimension of the first outer perimeter fluid passageway directly from the first interior edge to the perimeter wall is within a range of 0.025×D to 0.15×D.

Clause 33. The static mixer according to Clause 29, wherein the perimeter wall of the housing defines a diameter D, and wherein a maximum width dimension of the first outer perimeter fluid passageway directly from the first interior edge to the perimeter wall is within a range of 0.03×D to 0.12×D.

Clause 34. The static mixer according to Clause 29, wherein the perimeter wall of the housing defines a diameter D, and wherein a maximum width dimension of the first outer perimeter fluid passageway directly from the first interior edge to the perimeter wall is within a range of 0.035×D to 0.1×D.

Clause 35. The static mixer according to Clause 29, wherein the perimeter wall of the housing defines a diameter D, and wherein a maximum width dimension of the first outer perimeter fluid passageway directly from the first interior edge to the perimeter wall is within a range of 0.04×D to 0.08×D.

Clause 36. The static mixer according to any one of Clauses 25 to 28, wherein the perimeter wall of the housing defines a circular surface, wherein the first outer perimeter fluid passageway includes a first end and a second end, and wherein the first end and the second end are separated from one another by an angle of at least 30° measured from a center of the circular surface.

Clause 37. The static mixer according to any one of Clauses 25 to 28, wherein the perimeter wall of the housing defines a circular surface, wherein the first outer perimeter fluid passageway includes a first end and a second end, and wherein the first end and the second end are separated from one another by an angle of 30° to 60° measured from a center of the circular surface.

Clause 38. The static mixer according to any one of Clauses 25 to 37, wherein the first surface includes an outer surface portion and an angled inner surface portion, and wherein the angled inner surface portion is angled forward with respect to the outer surface portion in a fluid flow direction of the static mixer.

Clause 39. The static mixer according to Clause 38, wherein the angled inner surface portion is angled forward with respect to the outer surface portion at an angle within a range of 20° to 45°; or wherein the inner surface portion is angled forward with respect to the outer surface portion at an angle within a range of 25° to 40°.

Clause 40. The static mixer according to Clause 38 or 39, wherein the outer surface portion defines an area $A_{300S1}$, wherein the angled inner surface portion defines an area $A_{300S2}$, and wherein a ratio $A_{300S1}/A_{300S2}$ of the area $A_{300S1}$ of the outer surface portion to the area $A_{300S2}$ of the angled inner surface portion is within a range of 0.5 to 2, within a range of 0.6 to 1.8, within a range of 0.75 to 1.6, within a range of 0.8 to 1.5, or within a range of 0.9 to 1.4.

Clause 41. The static mixer according to any one of Clauses 38 to 40, wherein the outer surface portion is oriented substantially perpendicular to the fluid flow direction of the static mixer.

Clause 42. The static mixer according to any one of Clauses 25 to 41, further comprising a first injection port extending through the housing and opening into the open interior space.

Clause 43. The static mixer according to Clause 42, wherein the first injection port opens into the open interior space at a location upstream of the first baffle section with respect to a fluid flow direction of the static mixer.

Clause 44. The static mixer according to any one of Clauses 25 to 43, wherein the first inner region of the first baffle section includes: (i) a first free edge portion having a first end and a second end, (ii) a first recessed edge portion, (iii) a first angled portion extending between the first end of the first free edge portion and the first recessed edge portion, (iv) a second recessed edge portion, and (v) a second angled portion extending between the second end of the first free edge portion and the second recessed edge portion.

Clause 45. The static mixer according to Clause 44, wherein the first baffle section further includes: (i) a third angled portion extending from the first recessed edge portion to the first outer perimeter region and (ii) a fourth angled portion extending from the second recessed edge portion to the first outer perimeter region.

Clause 46. The static mixer according to Clause 45, wherein the third angled portion is angled with respect to the first recessed edge portion at an angle within a range of 30° to 70°, and wherein the fourth angled portion is angled with respect to the second recessed edge portion at an angle within a range of 30° to 70°; or wherein the third angled portion is angled with respect to the first recessed edge portion at an angle within a range of 35° to 70°, and wherein the fourth angled portion is angled with respect to the second recessed edge portion at an angle within a range of 35° to 70°.

Clause 47. The static mixer according to any one of Clauses 25 to 46, wherein the first outer perimeter fluid passageway defines an area $A_{310}$, wherein the first baffle section defines an area $A_{300}$, and wherein a ratio $A_{310}/A_{300}$ of the area $A_{310}$ of the first outer perimeter fluid passageway to the area $A_{300}$ of the first baffle section is within a range of 0.03 to 0.2, within a range of 0.03 to 0.175, within a range of 0.03 to 0.15, or within a range of 0.04 to 0.12.

Clause 48. The static mixer according to any one of Clauses 1 to 48, wherein the housing constitutes a base member for a wafer style static mixer component.

Clause 49. The static mixer according to Clause 48, wherein a first end of the base member includes a first seal member and the second end of the base member includes a second seal member.

Clause 50. The static mixer according to any one of Clauses 1 to 48, wherein: (i) the housing constitutes a fluid pipeline, (ii) the perimeter wall constitutes an interior surface of the fluid pipeline, and (iii) the first baffle section is mounted directly to the interior surface of the fluid pipeline.

What is claimed is:

1. A static mixer, comprising:

a housing including a perimeter wall that defines an open interior space; and a first baffle section located within the open interior space, the first baffle section including a first surface that extends between a first outer perimeter side of the first baffle section and a first inner edge of the first baffle section, wherein the first outer perimeter side includes: (i) a first closed perimeter portion extending to the perimeter wall, (ii) a second closed perimeter portion extending to the perimeter wall, and (iii) a first perimeter open space defining a first fluid flow passage between the first closed perimeter portion and the second closed perimeter portion, wherein the first inner edge of the first baffle section includes: (i) a first free edge portion having a first end and a second end, (ii) a first recessed edge portion, (iii) a first angled portion extending between the first end of the first free edge portion and the first recessed edge portion, (iv) a second recessed edge portion, and (v) a second angled portion extending between the second end of the first free edge portion and the second recessed edge portion, and wherein the first recessed edge portion and the second recessed edge portion are parallel with the first free edge portion.

2. The static mixer according to claim 1, wherein the first baffle section further includes: (i) a third angled portion extending from the first recessed edge portion to the first closed perimeter portion and (ii) a fourth angled portion extending from the second recessed edge portion to the second closed perimeter portion.

3. The static mixer according to claim 1, wherein the first surface includes an outer surface portion and an angled inner surface portion, and wherein the angled inner surface portion is angled forward with respect to the outer surface portion in a fluid flow direction of the static mixer.

4. The static mixer according to claim 3, wherein the first perimeter open space includes a first end, a second end, a first interior edge extending between the first end and the second end, and a first exterior edge extending between the first end and the second end, wherein the first exterior edge is located in close proximity to the perimeter wall of the housing.

5. The static mixer according to claim 3, wherein the perimeter wall of the housing defines a circular surface, wherein the first perimeter open space includes a first end and a second end, and wherein the first end and the second end are separated from one another by an angle of 30° to 60° measured from a center of the circular surface.

6. The static mixer according to claim 3, further comprising: a second baffle section located within the open interior space, the second baffle section including a second surface that extends between a second outer perimeter side of the second baffle section and a second inner edge of the second baffle section, wherein the second outer perimeter side includes: (i) a third closed perimeter portion extending to the perimeter wall, (ii) a fourth closed perimeter portion extending to the perimeter wall, and (iii) a second perimeter open space defining a second fluid flow passage between the third closed perimeter portion and the fourth closed perimeter portion, wherein the second surface includes an outer surface portion and an angled inner surface portion, wherein the angled inner surface portion of the second surface is angled forward with respect to the outer surface portion of the second surface in the fluid flow direction of the static mixer, wherein the open interior space completely separates the first baffle section from the second baffle section across and through a center of the housing, wherein the open interior space defines a diameter dimension D, wherein the second inner edge is spaced apart from the first inner edge across the open interior space by a spacing distance within a range of 0.02×D to 0.3×D, wherein the first perimeter open space is the only opening defined through the first surface of the first baffle section, and wherein the second perimeter open space is the only opening defined through the second surface of the second baffle section.

7. The static mixer according to claim 3, wherein the angled inner surface portion is angled forward with respect to the outer surface portion at an angle within a range of 20° to 45°.

8. The static mixer according to claim 3, wherein the outer surface portion defines an area $A_{300S1}$, wherein the angled inner surface portion defines an area $A_{300S2}$, and wherein a ratio $A_{300S1}/A_{300S2}$ of the area $A_{300S1}$ of the outer surface portion to the area $A_{300S2}$ of the angled inner surface portion is within a range of 0.5 to 2.

9. The static mixer according to claim 3, wherein the first perimeter open space defines an area $A_{310}$, wherein the first baffle section defines an area $A_{300}$, and wherein a ratio $A_{310}/A_{300}$ of the area $A_{310}$ of the first perimeter open space to the area $A_{300}$ of the first baffle section is within a range of 0.03 to 0.2.

10. The static mixer according to claim 3, wherein the housing constitutes a base member for a wafer style static mixer component.

11. The static mixer according to claim 3, wherein: (i) the housing constitutes a fluid pipeline, (ii) the perimeter wall constitutes an interior surface of the fluid pipeline, and (iii) the first baffle section is mounted directly to the interior surface of the fluid pipeline.

12. The static mixer according to claim 3, further comprising:

a second baffle section located within the open interior space, the second baffle section including a second surface that extends between a second outer perimeter side of the second baffle section and a second inner edge of the second baffle section, wherein the second outer perimeter side includes: (i) a third closed perimeter portion extending to the perimeter wall, (ii) a fourth closed perimeter portion extending to the perimeter wall, and (iii) a second perimeter open space defining a second fluid flow passage between the third closed perimeter portion and the fourth closed perimeter portion, and wherein the second inner edge is spaced apart from the first inner edge.

13. The static mixer according to claim 12, wherein the second baffle section is sized, shaped, and oriented within the open interior space to have mirror symmetry with the first baffle section located within the open interior space.

14. The static mixer according to claim 3, wherein the first perimeter open space includes a first end, a second end, and a first interior edge extending between the first end and the second end, wherein the first interior edge is spaced inward from the perimeter wall of the housing.

15. The static mixer according to claim 14, wherein the first interior edge of the first perimeter open space follows a surface contour of the perimeter wall of the housing.

16. A static mixer, comprising:

a housing including a perimeter wall that defines an open interior space;

a first baffle section located within the open interior space, the first baffle section including a first surface that extends between a first outer perimeter side of the first baffle section and a first inner edge of the first baffle section, wherein the first outer perimeter side includes: (i) a first closed perimeter portion extending to the perimeter wall, (ii) a second closed perimeter portion extending to the perimeter wall, and (iii) a first perimeter open space defining a first fluid flow passage between the first closed perimeter portion and the second closed perimeter portion; and a first injection port extending through the housing and opening into the open interior space, wherein the first injection port opens into the open interior space at a location: (i) upstream of the first baffle section with respect to a fluid flow direction of the static mixer, and (ii) axially aligned with the first perimeter open space.

* * * * *